(12) United States Patent
Walton et al.

(10) Patent No.: US 10,730,048 B2
(45) Date of Patent: Aug. 4, 2020

(54) EWOD DEVICE WITH HOLDBACK FEATURE FOR FLUID LOADING

(71) Applicant: Sharp Life Science (EU) Limited, Oxford (GB)

(72) Inventors: Emma Jayne Walton, Oxford (GB); Lesley Anne Parry-Jones, Oxford (GB)

(73) Assignee: Sharp Life Science (EU) Limited, Oxford (GB)

( * ) Notice: Subject to any disclaimer, the term of this patent is extended or adjusted under 35 U.S.C. 154(b) by 325 days.

(21) Appl. No.: 15/629,201

(22) Filed: Jun. 21, 2017

(65) Prior Publication Data

US 2018/0369814 A1 Dec. 27, 2018

(51) Int. Cl.
| | | |
|---|---|---|
| *B01L 3/00* | (2006.01) | |
| *B01F 13/00* | (2006.01) | |
| *G02B 26/00* | (2006.01) | |
| *F04B 19/00* | (2006.01) | |
| *F16K 99/00* | (2006.01) | |
| *G01N 27/447* | (2006.01) | |

(52) U.S. Cl.
CPC .... *B01L 3/502753* (2013.01); *B01F 13/0071* (2013.01); *B01L 3/502715* (2013.01); *B01L 3/502784* (2013.01); *B01L 3/502792* (2013.01); *G02B 26/005* (2013.01); *B01F 13/0074* (2013.01); *B01L 2200/0605* (2013.01); *B01L 2200/0642* (2013.01); *B01L 2300/044* (2013.01); *B01L 2300/0867* (2013.01); *B01L 2400/0427* (2013.01); *F04B 19/00* (2013.01); *F16K 99/0001* (2013.01); *G01N 27/44791* (2013.01)

(58) Field of Classification Search
None
See application file for complete search history.

(56) References Cited

U.S. PATENT DOCUMENTS

| | | | | |
|---|---|---|---|---|
| 5,975,153 | A * | 11/1999 | Hill | B01L 3/502715 141/31 |
| 2014/0014517 | A1* | 1/2014 | Srinivasan | B01L 3/0268 204/601 |
| 2015/0174578 | A1* | 6/2015 | Srinivasan | B01F 13/0071 222/420 |

(Continued)

*Primary Examiner* — Gurpreet Kaur
*Assistant Examiner* — Steven E Rosenwald
(74) *Attorney, Agent, or Firm* — Renner, Otto, Boisselle & Sklar, LLP

(57) ABSTRACT

An electrowetting on dielectric (EWOD) device includes a first substrate assembly and a second substrate assembly spaced apart to define a channel between them; an input port in fluid communication with the channel, the input port defining an input well for receiving a fluid for inputting into the channel; and a control port in fluid communication with the channel, the control port defining a control well for receiving a fluid and having a seal that seals the control port in a sealed state in which fluid is restricted from entering the control well from the channel. When the seal is pierced, the control port is placed in an unsealed state permitting fluid to enter the control well from the channel. The electrowetting force may be manipulated to remove the dispensed droplets via an exit port. Multiple cycles of fluid input/droplet manipulation/fluid extraction may be repeated to perform complex reaction protocols.

34 Claims, 26 Drawing Sheets

(56) References Cited

U.S. PATENT DOCUMENTS

2016/0074863 A1* 3/2016 Sturmer ............ B01L 3/502792
  204/602
2016/0195492 A1* 7/2016 Bauer ................ B01F 13/0071
  204/602

* cited by examiner

Fig. 1: PRIOR ART

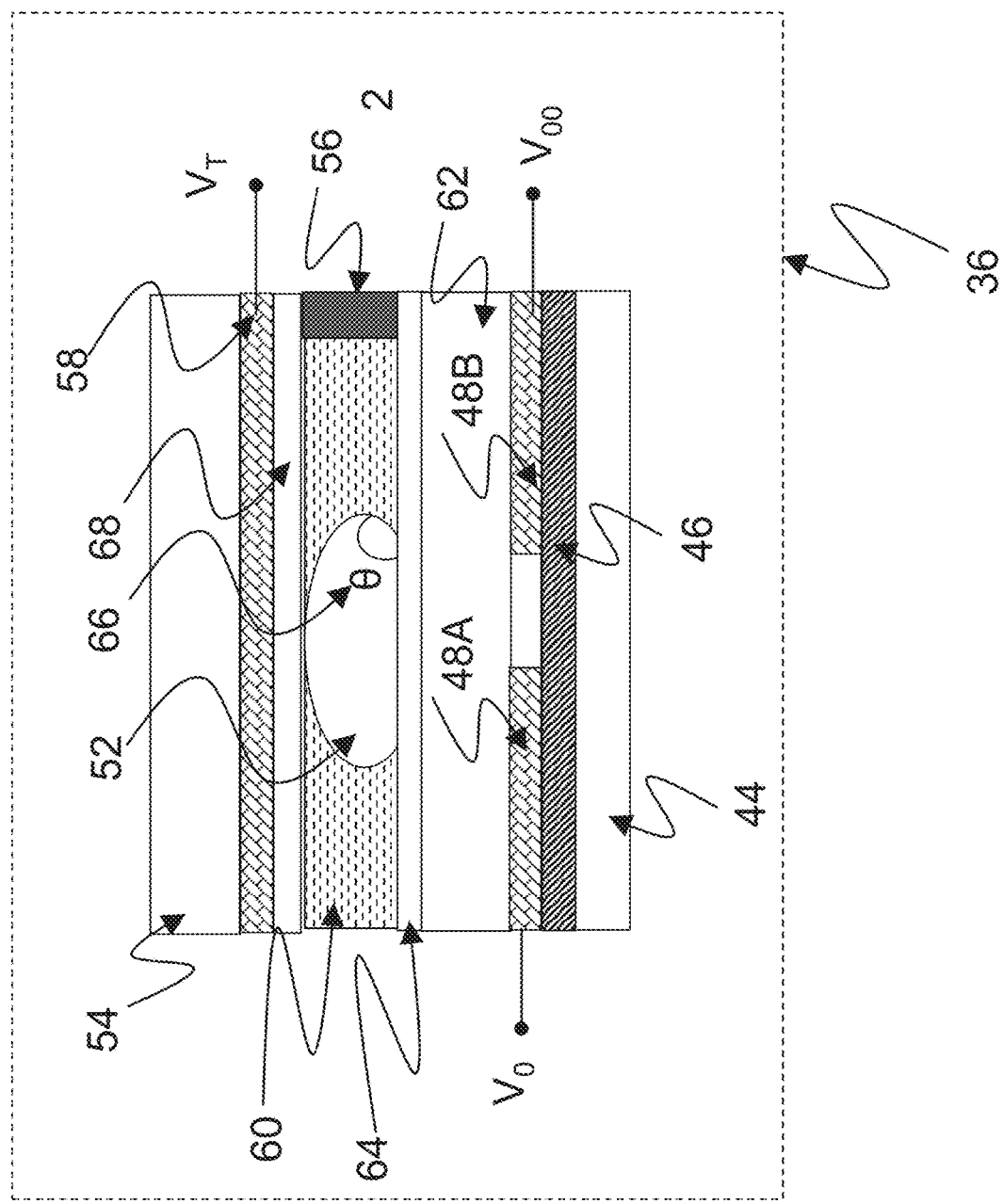

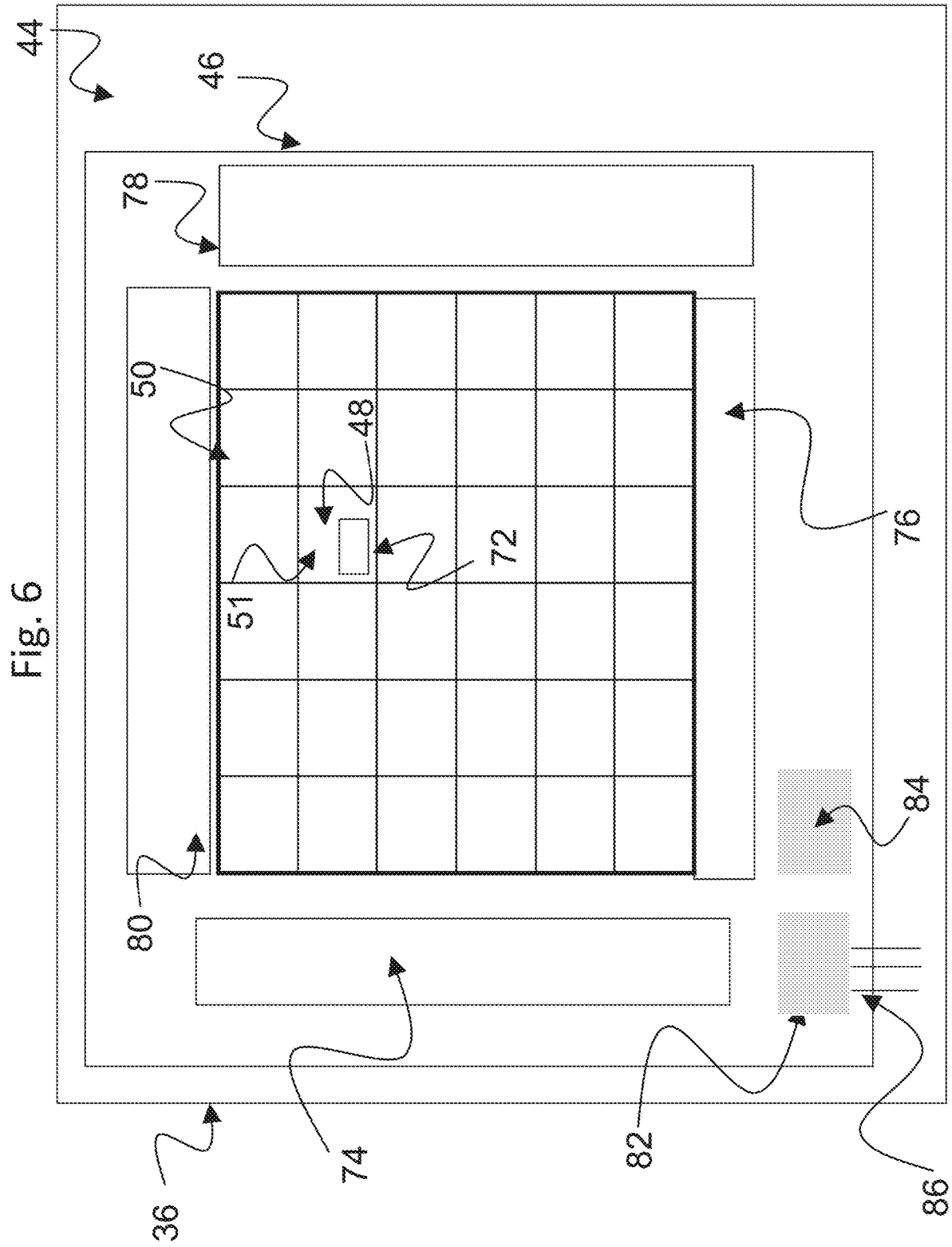

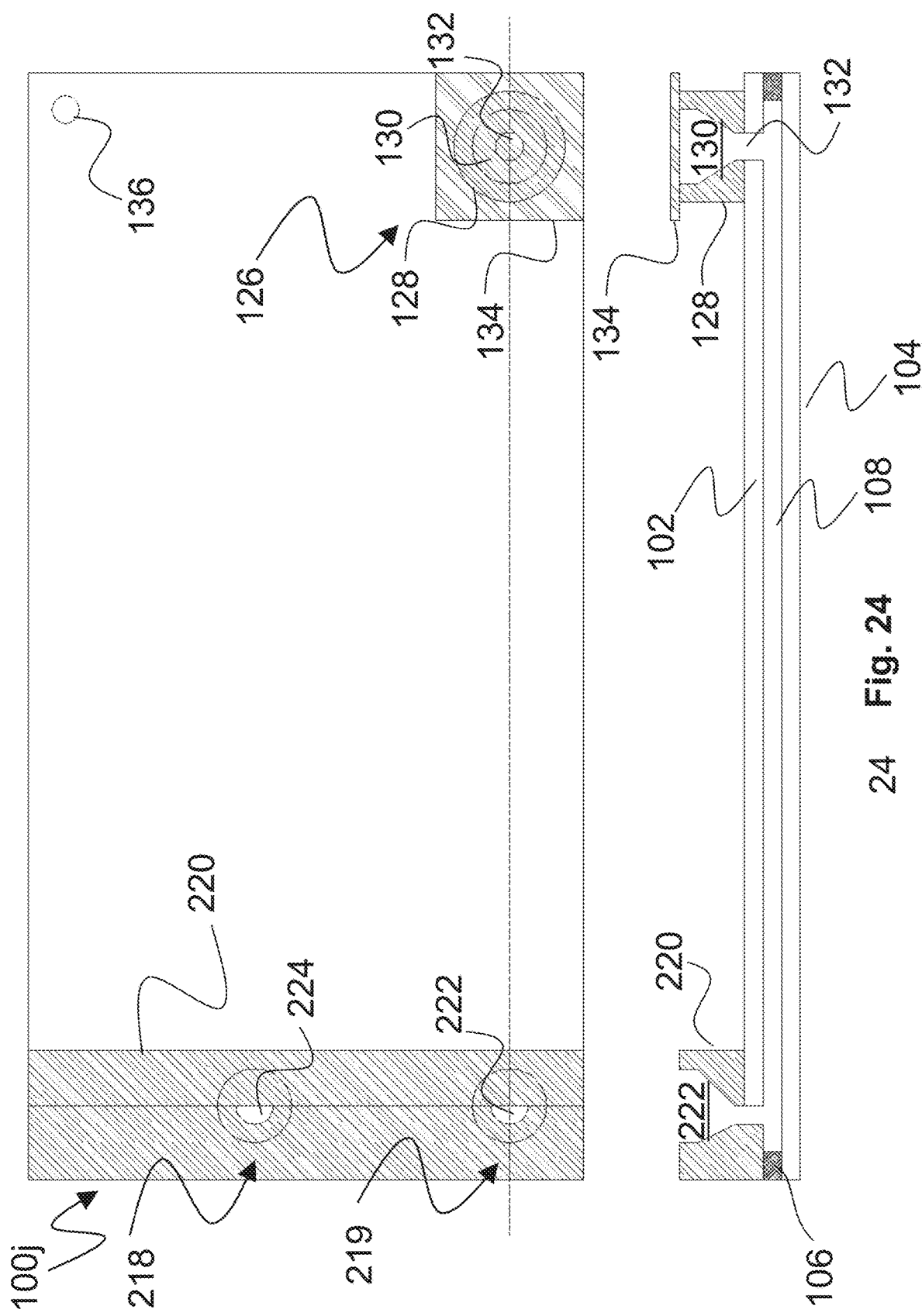

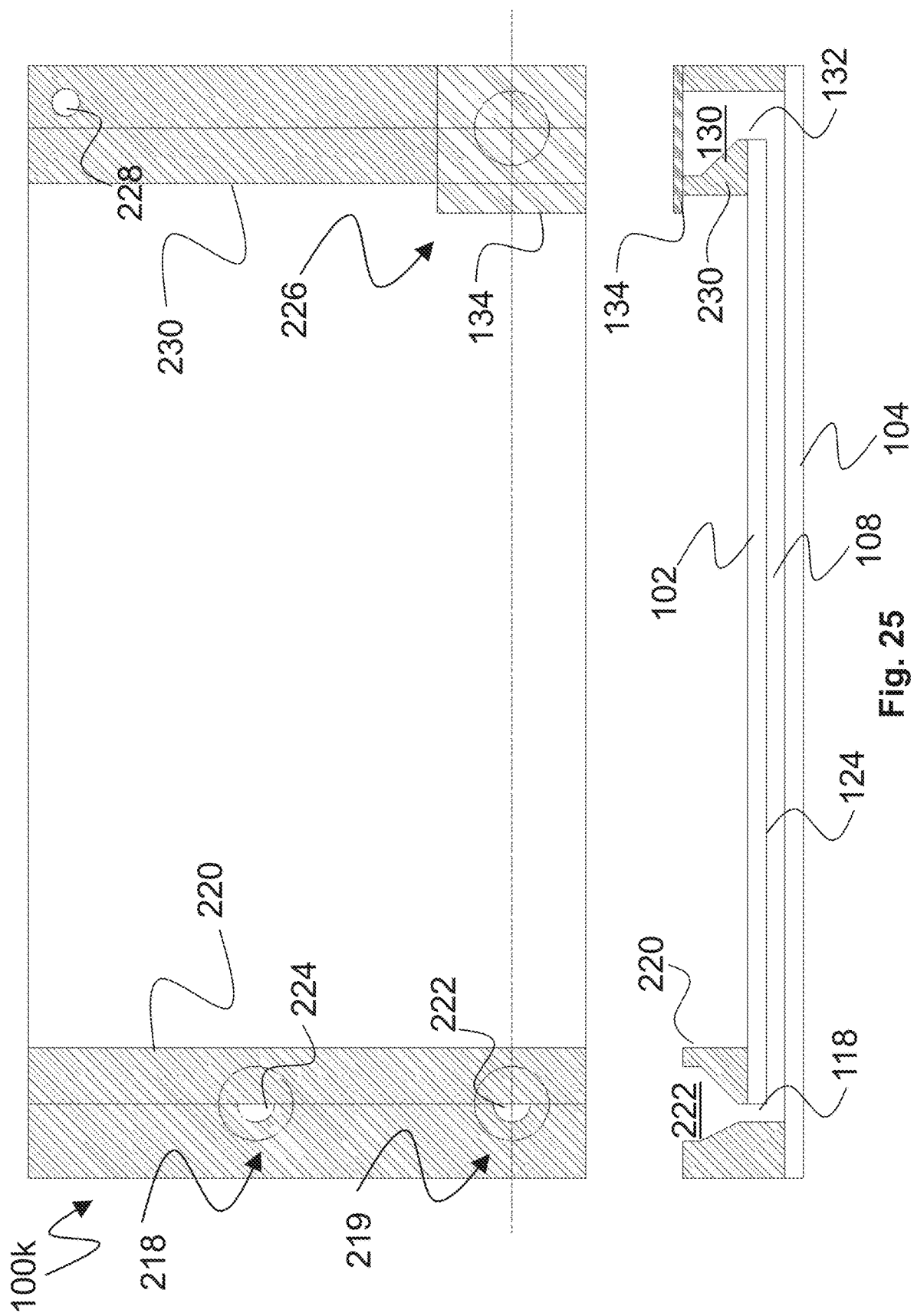

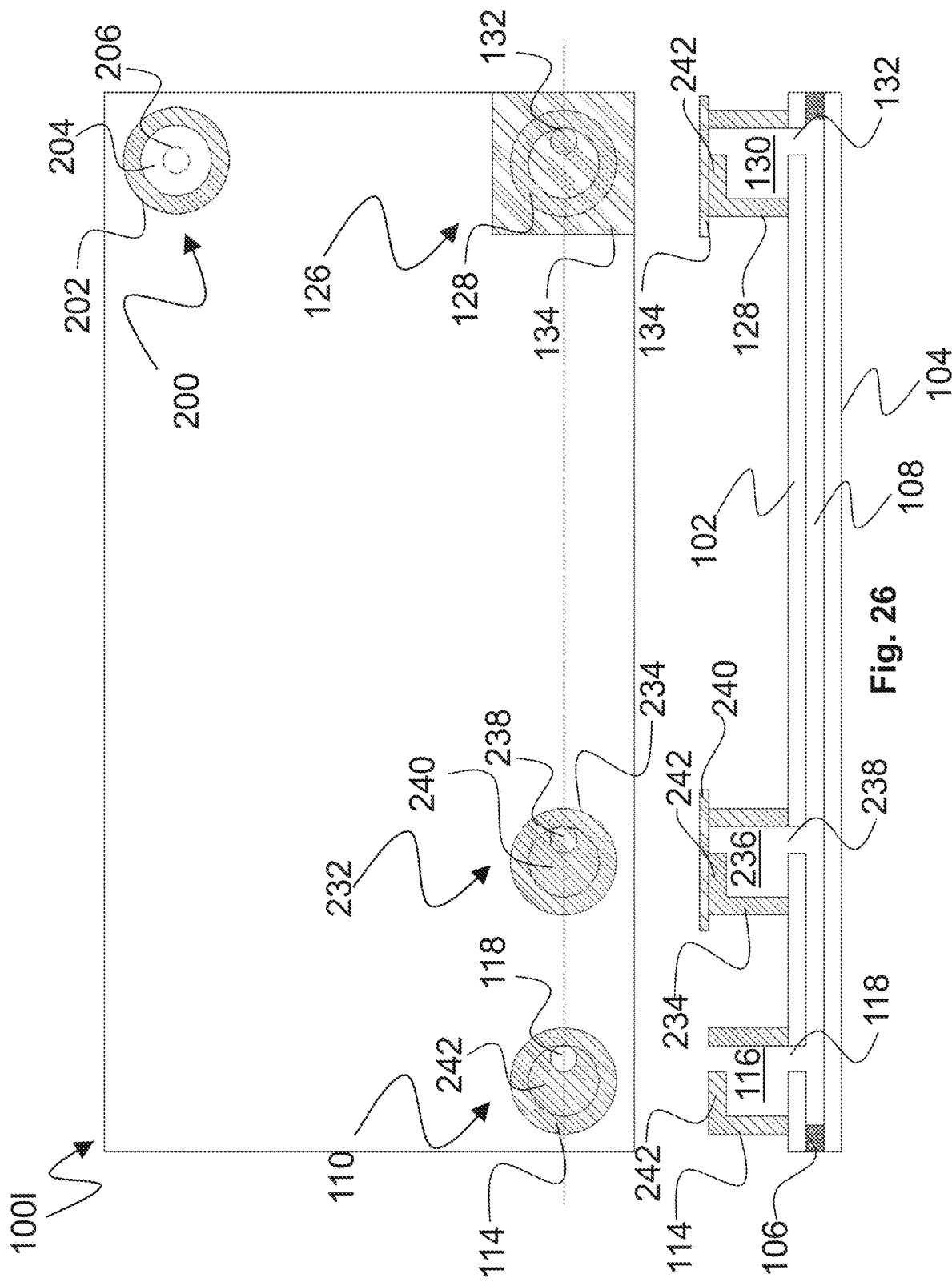

EWOD DEVICE WITH HOLDBACK FEATURE FOR FLUID LOADING

TECHNICAL FIELD

The present invention relates to droplet microfluidic devices, and more specifically to Active Matrix Electrowetting-On-Dielectric (AM-EWOD) devices, including structures and control methods for enhanced loading of fluid into such devices.

BACKGROUND ART

Electrowetting on dielectric (EWOD) is a well-known technique for manipulating droplets of fluid by the application of an electric field. Active Matrix EWOD (AM-EWOD) refers to implementation of EWOD in an active matrix array incorporating transistors, for example by using thin film transistors (TFTs). It is thus a candidate technology for digital microfluidics for lab-on-a-chip technology. An introduction to the basic principles of the technology can be found in "Digital microfluidics: is a true lab-on-a-chip possible?", R. B. Fair, Microfluid. Nanofluid. (2007) 3:245-281).

FIG. 1 shows a part of a conventional EWOD device in cross section. The device includes a lower substrate 10, the uppermost layer of which is formed from a conductive material which is patterned so that a plurality of array element electrodes 12 (e.g., 12A and 12B in FIG. 1) are realized. The electrode of a given array element may be termed the element electrode 12. A liquid droplet 14, including a polar material (which is commonly also aqueous and/or ionic), is constrained in a plane between the lower substrate 10 and a top substrate 16. A suitable gap or channel between the two substrates may be realized by means of a spacer 18, and a non-polar surround fluid 20 (e.g. oil) may be used to occupy the volume not occupied by the liquid droplet 14. An insulator layer 22 disposed upon the lower substrate 10 separates the conductive element electrodes 12A, 12B from a first hydrophobic coating 24 upon which the liquid droplet 14 sits with a contact angle 26 represented by θ. The hydrophobic coating is formed from a hydrophobic material (commonly, but not necessarily, a fluoropolymer).

On the top substrate 16 is a second hydrophobic coating 28 with which the liquid droplet 14 may come into contact. Interposed between the top substrate 16 and the second hydrophobic coating 28 is a reference electrode 30.

The contact angle θ is defined as shown in FIG. 1, and is determined by the balancing of the surface tension components between the solid-to liquid ($\gamma_{SL}$), the liquid-to non-polar surrounding fluid ($\gamma_{LG}$) and the solid to non-polar surrounding fluid ($\gamma_{SG}$) interfaces, and in the case where no voltages are applied satisfies Young's law, the equation being given by:

$$\cos\theta = \frac{\gamma_{SG} - \gamma_{SL}}{\gamma_{LG}} \quad \text{(equation 1)}$$

In operation, voltages termed the EW drive voltages, (e.g. $V_T$, $V_0$ and $V_{00}$ in FIG. 1) may be externally applied to different electrodes (e.g. reference electrode 30, element electrodes 12, 12A and 12B, respectively). The resulting electrical forces that are set up effectively control the hydrophobicity of the hydrophobic coating 24. By arranging for different EW drive voltages (e.g. $V_0$ and $V_{00}$) to be applied to different element electrodes (e.g. 12A and 12B), the liquid droplet 14 may be moved in the lateral plane between the two substrates 10 and 16.

Example configurations and operation of EWOD devices are described in the following. U.S. Pat. No. 6,911,132 (Pamula et al., issued Jun. 28, 2005) discloses a two dimensional EWOD array to control the position and movement of droplets in two dimensions. U.S. Pat. No. 6,565,727 (Shenderov, issued May 20, 2003) further discloses methods for other droplet operations including the splitting and merging of droplets, and the mixing together of droplets of different materials. U.S. Pat. No. 7,163,612 (Sterling et al., issued Jan. 16, 2007) describes how TFT based thin film electronics may be used to control the addressing of voltage pulses to an EWOD array by using circuit arrangements very similar to those employed in AM display technologies.

The approach of U.S. Pat. No. 7,163,612 may be termed "Active Matrix Electrowetting on Dielectric" (AM-EWOD). There are several advantages in using TFT based thin film electronics to control an EWOD array, namely:

Electronic driver circuits can be integrated onto the lower substrate 10.

TFT-based thin film electronics are well suited to the AM-EWOD application. They are cheap to produce so that relatively large substrate areas can be produced at relatively low cost.

TFTs fabricated in standard processes can be designed to operate at much higher voltages than transistors fabricated in standard CMOS processes. This is significant since many EWOD technologies require electro-wetting voltages in excess of 20V to be applied.

As described above with respect to the representative EWOD structure, the EWOD channel or gap defined by the two substrates initially is filled with the non-polar fluid (oil). The liquid droplets 14 including a polar material, i.e., the droplets to be manipulated by operation of the EWOD device, must be inputted from a fluid reservoir into the EWOD channel or gap. As the fluid from the reservoir for the droplets in inputted, oil gets displaced and is removed from the EWOD channel.

Different mechanisms have been devised for the inputting or loading of polar fluid for the liquid droplets into such devices. For example, U.S. Pat. No. 8,702,938 (Srinivasan et al., issued Apr. 22, 2014) describes an EWOD device with a plastic frame surrounding a glass substrate. The plastic frame contains holes which provide a fluid path from the exterior of a droplet actuator and into the EWOD channel or gap. US20100282609 (Pollack et al., published Nov. 11, 2010) describes the use of a piston mechanism to force fluid into reservoirs contained in a device already loaded with oil. US20100032293 (Pollack et al., published Feb. 11, 2010) describes a filling mechanism where fluid flows onto the array containing oil via a variable pressure source, and droplets of fluid are held on the array and the excess fluid is drained. US20130161193 (Jacobs et al., published Jun. 27, 2013) describes a method to drive fluid into a device filled with oil by using, for example, a bistable actuator. Mechanisms for precise control of the input of fluid into the EWOD channel or gap are not taught in these patent documents.

U.S. Pat. No. 9,630,180 (Srinivasan et al., issued Apr. 25, 2017) describes controlling the hydrostatic head of a droplet actuator to avoid fluid spontaneously flowing into the gap between the bottom and top substrates. The patent illustrates schematics of potential droplet actuators and associated electrode patterns for drawing fluid out of such a droplet actuator. In addition, this patent describes having a waste reservoir which is made as large as possible to lower the pressure at the reservoir. As representative, the teachings include restrictions on the relative sizes of different parts of the droplet actuator.

WO 2017/047082 (Walton et al., published Mar. 23, 2017) describes partially filling a device with a metered volume of oil. Fluid is then input into the device easily by venting air. An exemplary embodiment includes filling the device with oil, adding fluid to the input ports, then extracting a sufficient volume of oil to enable at least some of the fluid to enter the device. With the disclosed device configurations, there is a limit to the quantity of fluid that can be processed by such a device, and the loading of fluid occurs with the user manually removing a portion of the oil.

SUMMARY OF INVENTION

The manner and efficiency of the input of the polar fluid for the liquid droplets can affect the overall performance of the EWOD device. The present invention relates to EWOD and AM-EWOD microfluidic devices, and to controlling the input and output of fluids to and from the hydrophobic EWOD channel defined between the substrate structures of such devices. The described configurations are of particular relevance to devices where the total volume of fluid which needs to be processed through the device exceeds that which can be handled within the EWOD channel at any one time, such as may occur over multiple droplet manipulation operations or complex reaction protocols. Because the total processed fluid exceeds that which can be handled within the EWOD channel at any one time, in conventional configurations overfilling can occur which can undermine device operation as excess oil spills over onto the external portions of the device. On the other hand, fluid needs to be inputted, processed and then removed in an efficient manner, so that a next portion of fluid can be inputted and processed to maintain a desired throughput.

Efficiency with high-throughput versus the avoidance of over-filling presents a delicate balance for device operation that is not adequately addressed by conventional configurations. For example, none of the patent documents referenced above recognizes the potential for over filling the device with oil as fluid for the droplets is loaded, and the patent documents do not address efficient ways to extract fluid of the droplets from the device to ready the device for input of a subsequent portion of polar fluid for droplets to be processed. Without precise control of fluid input and extraction, a high throughput without over filling is not achieved.

As referenced above, the fluids that are introduced to form the liquid droplets for manipulation are polar. As such, in the absence of an electrowetting voltage, such fluids tend to repel from the hydrophobic surfaces that define the EWOD channel. While the electrowetting voltage is actuated, such surfaces become hydrophilic to better accept the polar fluid, but filling under action of the electrowetting voltage itself is not readily controlled. Accordingly, in conventional systems pipetting the fluid into the EWOD channel may be employed, but upon removal of the pipette an undesirable backflow of the fluid out from the EWOD channel can occur, and such input method also does not address any potential for overfilling.

Accordingly, the present disclosure relates to an EWOD device configuration having structures that perform fluid input and extraction in a controlled and automated manner, with the use of a seal mechanism to initiate the fluid input. Aspects of the device include an EWOD device structure and fluid input methods whereby an input fluid can be "held back" outside the channel in a dedicated fluid input well, and then input into the channel at the desired time in a controlled and reproducible manner through the manipulation of the seal mechanism of a control port. In exemplary embodiments, fluid may be retained in a fluid input well, which may be a plastic fluid holding well, prior to input into the EWIOD channel. The structure of the device may include at least one fluid input port for inputting the fluid, and at least one control port for controlling such input, the control port having a removable seal. A vent hole also may be provided through the top substrate assembly for the elimination of air from the EWOD channel. The seal is initially in a sealing position to seal the control port during a fluid holding state, and the seal is removed from the sealing position to unseal the control port to initiate a fluid input state.

An exemplary method for controlling fluid input into the EWOD channel of the EWOD device may include the following steps. First, oil is input into the EWOD channel via at least one of the fluid input ports. The fluid control port does not fill with oil due to the presence of the seal, and any excess oil fills the fluid input wells of the input ports. In addition, oil is held back within the vent hole in the top substrate due to surface tension, i.e., the oil does not spill over the top substrate and generates a requisite hydrostatic pressure for inputting fluid into the device. Second, a polar fluid reservoir used for forming the liquid droplets is input into a fluid input port, and is maintained within an input well defined by the fluid input port during a fluid holding state. Because of the presence of the seal, fluid from the fluid reservoir substantially does not enter the EWOD channel during the fluid holding state at this point even if an electrowetting force is applied to the fluid in the input well. Third, a fluid input state is initiated by removing the seal from control port, either by actually removing the seal or at least piercing the seal to render the control port in an unsealed state. Accordingly, filling is initiated by removing or piercing the seal on the control port, and this results in an automatic internal displacement of oil to fill a control well defined by the control port. Fourth, the electrowetting mechanism is used to dispense droplets from the input fluid well into the EWOD channel in a controlled manner under software control executed by the EWOD device control system. There may be multiple fluid input ports and corresponding input wells from which fluid may be inputted into the EWOD channel. The total volume of fluid that can enter the EWOD channel, comprised of any suitable number of droplets input from any of the fluid input wells, generally is determined by the quantity of oil displaced from the channel by the removal or piercing of the control port seal.

In exemplary embodiments, when it is desired to input an additional volume of fluid that exceeds a maximum that can be handled within the EWOD channel at any one time, the processed fluid is extracted to ready the device for input of additional fluid into the EWOD channel. This may be accomplished by performing the following additional steps, and multiple cycles of input/droplet manipulation/extraction may be repeated. First, one or more droplets are moved to an exit port, which may be part of the control port, by electrowetting. Second, the electrowetting is deactivated in the region of the exit port, and the fluid leaves the EWOD channel and enters the control well from through the exit port under the hydrostatic pressure. Additional fluid can now be input into the EWOD channel through one or more of the input fluid ports using the electrowetting mechanism, by exploiting the volume displaced within the EWOD channel by the extraction of fluid at the exit port.

In exemplary embodiments, therefore, an electrowetting on dielectric (EWOD) device includes a first substrate assembly and a second substrate assembly spaced apart to define a channel between the first and second substrate assemblies; an input port in fluid communication with the channel, the input port defining an input well for receiving a fluid for inputting into the channel; and a control port in fluid communication with the channel, the control port defining a control well for receiving a fluid and having a seal that seals the control port in a sealed state in which fluid is restricted from entering the control well from the channel. When the seal is removed or pierced, the control port is placed in an unsealed state thereby permitting fluid to enter the control well from the channel.

Another aspect of the invention is an enhanced method of controlling fluid flow through an EWOD device using such an EWOD device with a sealed control port. The method may include the steps of inputting a non-polar fluid into the channel via the input port, wherein excess fluid after filling the EWOD channel accumulates within the input well and is restricted from entering the control well by the seal; inputting a polar fluid into the input well to form a fluid reservoir at a channel port that fluidly connects the input well to the channel; and removing or piercing the seal to place the control port in an unsealed state, wherein a portion of the non-polar fluid within the channel is displaced from the channel into the control well, and a portion of the polar fluid of the fluid reservoir enters the channel from the input well. After the seal is removed or pierced, an electrowetting force may be applied to dispense one or more liquid droplets from the fluid reservoir for manipulation within the channel. To remove dispensed droplets from the channel, the method further may include applying the electrowetting force to move the dispensed droplets to an exit port in fluid communication with the EWOD channel; forming an exit reservoir of the moved dispensed droplets adjacent to the exit port; and deactivating the electrowetting force in a region of the exit port, wherein the exit reservoir exits the channel via the exit port under a hydrostatic force. Multiple cycles of fluid input/droplet manipulation/fluid extraction may be repeated to perform complex reaction protocols.

The present invention has advantages over conventional filling mechanisms such as those described in the background section. For example, U.S. Pat. No. 9,630,180 uses the hydrostatic head of pressure of the droplet actuator to allow fluid into the EWOD channel between the bottom and top substrates. Additionally, U.S. Pat. No. 9,630,180 refers to a 'dead volume'—the volume of fluid which remains in the well and cannot be brought onto the device. An advantage of the present invention is that the dead volume is smaller. U.S. Pat. No. 9,630,180 also refers to an activation volume, as the minimum volume of fluid required to generate a sufficient head of pressure. A further advantage of the present invention is that the activation volume can be smaller since the required difference in the head of pressure is generated be means of the seal. This invention is thus able to make more efficient use of fluid input into the well.

Such device does not use a seal to create a large difference in hydrostatic pressure, and there is presumably a limit to the quantity of fluid that can be drawn on in this manner. WO 2017/047082 describes filling the device with oil, adding fluid to the input ports, and then then extracting a sufficient volume of oil to enable at least some of the fluid to enter the device. There is a limit to the quantity of fluid which can be processed by such a device, as it is determined by the amount of oil being extracted. This patent document does not recognize the potential for over filling the device, and does not provide for any automated fluid input. Accordingly, the conventional configurations cannot remove oil and then load polar fluid for droplets into the EWOD channel, and then extract fluid from the device for subsequent input of additional polar fluid for droplets, in a controlled and automated manner with the use of a seal to initiate the fluid input.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

BRIEF DESCRIPTION OF DRAWINGS

FIG. 4 is a drawing depicting a cross section through some of the array elements of the exemplary AM-EWOD device of FIG. 3.

FIG. 6 is a drawing depicting an exemplary arrangement of thin film electronics in the exemplary AM-EWOD device of FIG. 3 in accordance with embodiments of the present invention.

FIG. 24 is a drawing depicting a plan view and a side view of an eleventh exemplary EWOD device in accordance with embodiments of the present invention.

FIG. 25 is a drawing depicting a plan view and a side view of a twelfth exemplary EWOD device in accordance with embodiments of the present invention.

FIG. 26 is a drawing depicting a plan view and a side view of a thirteenth exemplary EWOD device in accordance with embodiments of the present invention.

DESCRIPTION OF EMBODIMENTS

Figure 1:
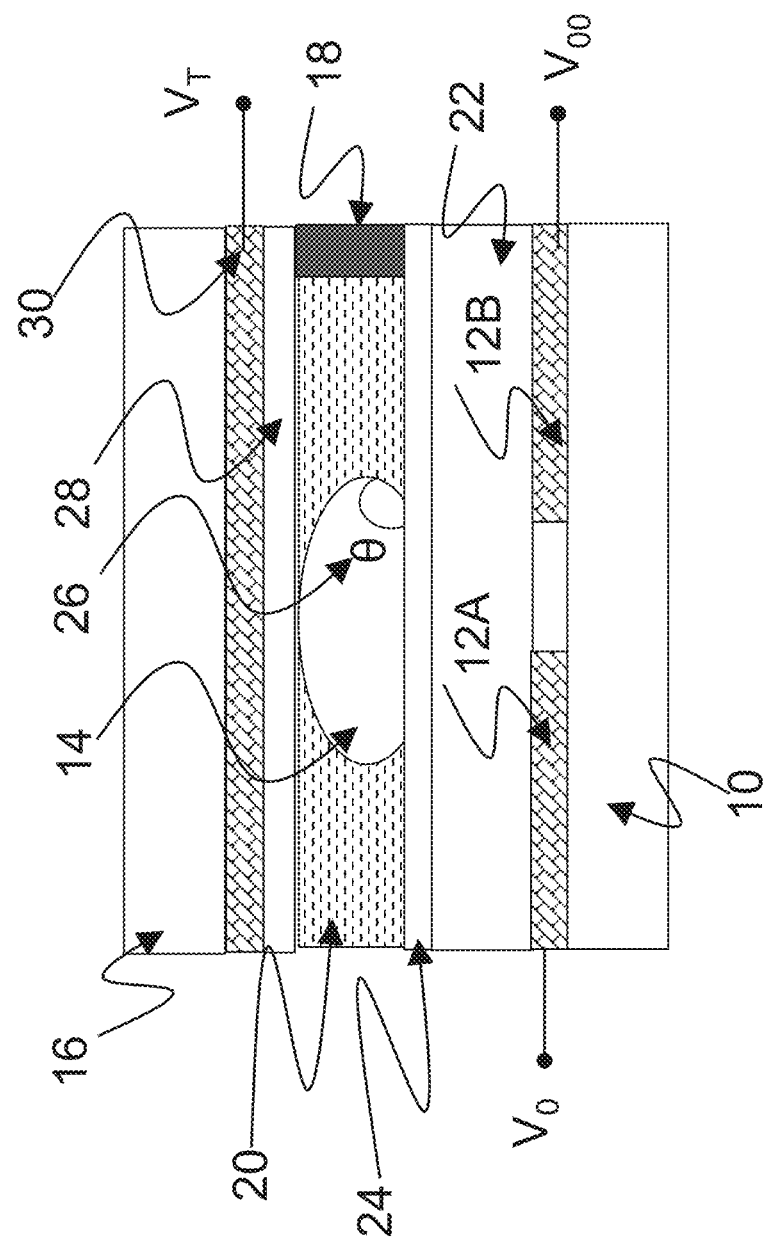
FIG. 1 is a drawing depicting a conventional EWOD device in cross-section.

Embodiments of the present invention will now be described with reference to the drawings, wherein like reference numerals are used to refer to like elements throughout. It will be understood that the figures are not necessarily to scale.

Figure 2:
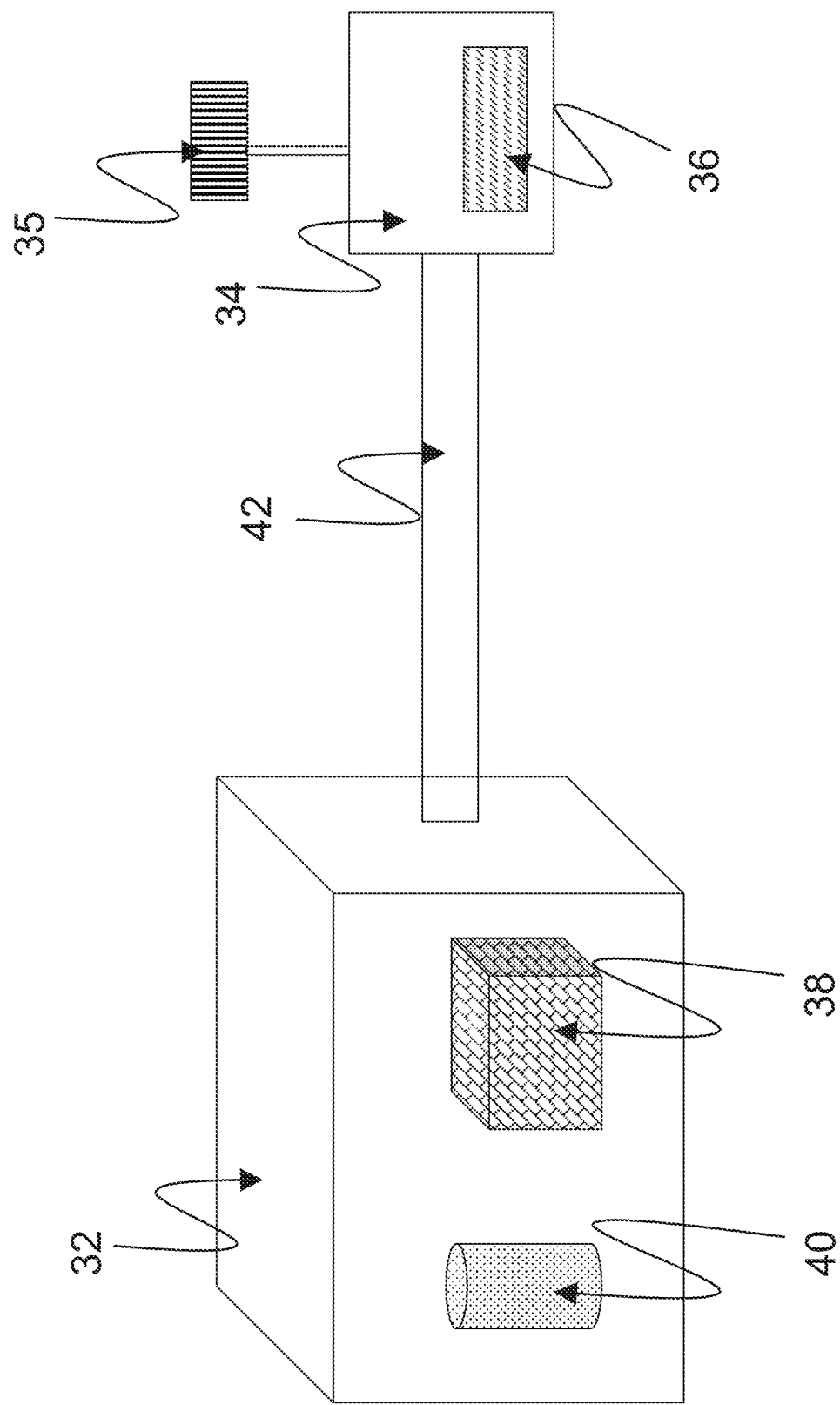
FIG. 2 is a drawing depicting an exemplary EWOD based microfluidic system in accordance with embodiments of the present invention.

FIG. 2 is a drawing depicting an exemplary EWOD based microfluidic system according to embodiments of the present invention. In the example of FIG. 2, the measurement system includes a reader 32 and a cartridge 34. The cartridge 34 may contain a microfluidic device, such as an EWOD or AM-EWOD device 36, as well as (not shown) fluid input ports into the device and an electrical connection as are conventional. The fluid input ports may perform the function of inputting fluid into the AM-EWOD device 36 and generating droplets within the device, for example by dispensing from input reservoirs as controlled by electro-wetting. As further detailed below, the microfluidic device includes an electrode array configured to receive the inputted fluid droplets.

The microfluidic system further may include a control system configured to control actuation voltages applied to the electrode array of the microfluidic device to perform manipulation operations to the fluid droplets. For example, the reader 32 may contain such a control system configured as control electronics 38 and a storage device 40 that may store any application software any data associated with the system. The control electronics 38 may include suitable circuitry and/or processing devices that are configured to carry out various control operations relating to control of the AM-EWOD device 36, such as a CPU, microcontroller or microprocessor.

Among their functions, the control electronics may comprise a part of the overall control system that may execute program code embodied as a control application within the storage device 40. It will be apparent to a person having ordinary skill in the art of computer programming, and specifically in application programming for electronic control devices, how to program the control system to operate and carry out logical functions associated with the stored control application. Accordingly, details as to specific programming code have been left out for the sake of brevity. The storage device 40 may be configured as a non-transitory computer readable medium, such as random access memory (RAM), a read-only memory (ROM), an erasable programmable read-only memory (EPROM or Flash memory), or any other suitable medium. Also, while the code may be executed by control electronics 38 in accordance with an exemplary embodiment, such control system functionality could also be carried out via dedicated hardware, firmware, software, or combinations thereof, without departing from the scope of the invention.

The control system may be configured to perform some or all of the following functions:

Define the appropriate timing signals to manipulate liquid droplets on the AM-EWOD device 36.

Interpret input data representative of sensor information measured by a sensor or sensor circuitry associated with the AM-EWOD device 36, including computing the locations, sizes, centroids and perimeters of liquid droplets on the AM-EWOD device 36.

Use calculated sensor data to define the appropriate timing signals to manipulate liquid droplets on the AM-EWOD device 36, i.e. acting in a feedback mode.

Provide for implementation of a graphical user interface (GUI) whereby the user may program commands such as droplet operations (e.g. move a droplet), assay operations (e.g. perform an assay), and the GUI may report the results of such operations to the user.

In accordance with embodiments of the present invention, and as further detailed below, the control system may include a thermal control unit configured to control temperature of the EWOD device within the EWOD channel as is suitable for a given reaction protocol.

In the example of FIG. 2, an external sensor module 35 may be provided for sensing droplet properties. For example, optical sensors as are known in the art may be employed as external sensors for sensing droplet properties. Suitable optical sensors include camera devices, light sensors, charged coupled devices (CCDs) and image similar image sensors, and the like. A sensor alternatively may be configured as internal sensor circuitry incorporated as part of the drive circuitry in each array element. Such sensor circuitry may sense droplet properties by the detection of an electrical property at the array element, such as impedance or capacitance.

The control system, such as via the control electronics 38, may supply and control the actuation electrowetting voltages applied to the electrode array of the microfluidics device 36, such as required voltage and timing signals to perform droplet manipulation operations and sense liquid droplets on the AM-EWOD device 36. The control electronics further may execute the application software to generate and output control voltages for droplet sensing and performing sensing operations. The reader 32 and cartridge 34 may be electrically connected together while in use, for example by a cable of connecting wires 42, although various other methods (e.g. wireless connection) of providing electrical communication may be used as are known to those of ordinary skill in the art.

Figure 3:
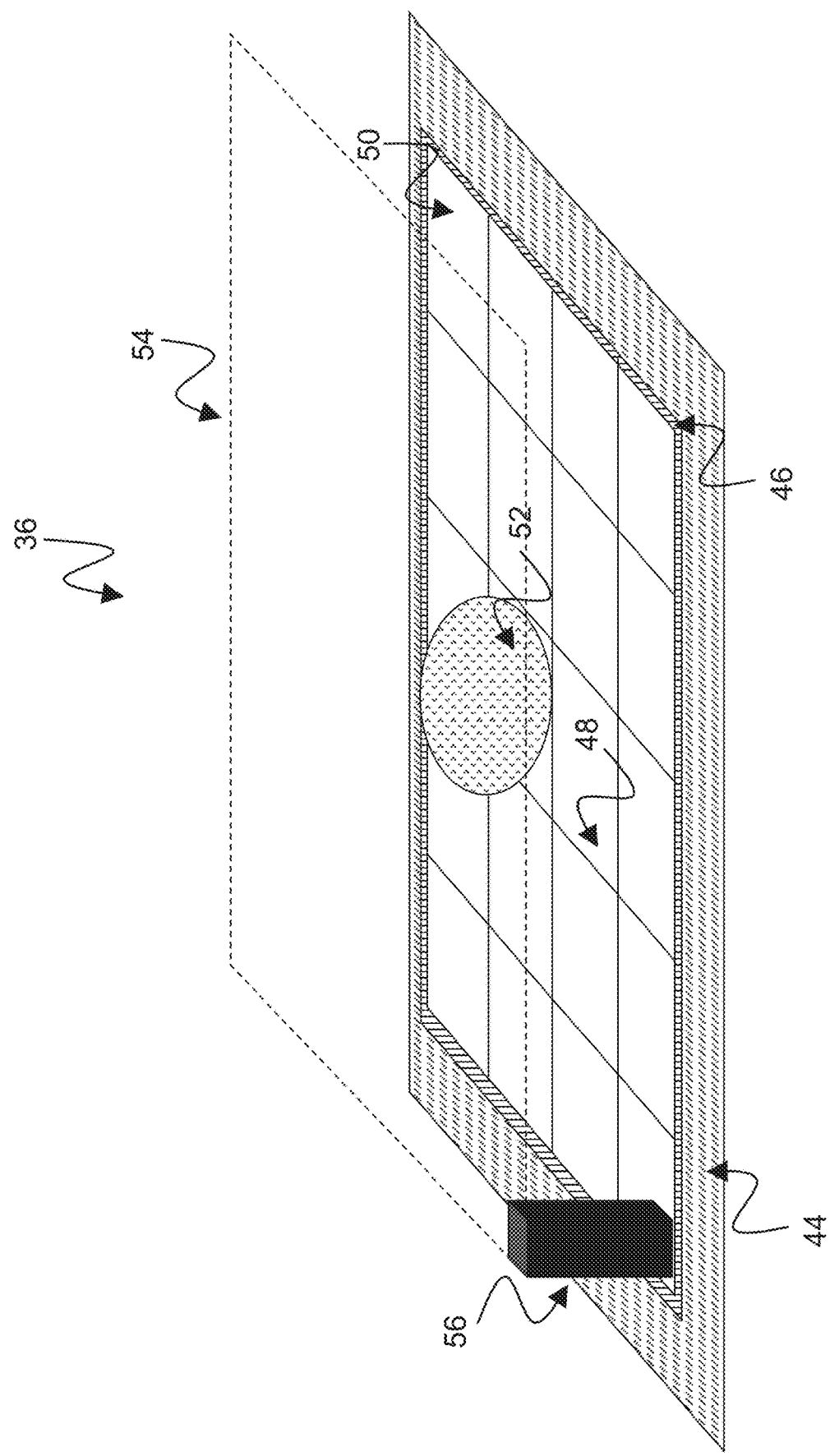
FIG. 3 is a drawing depicting an exemplary AM-EWOD device in schematic perspective in accordance with embodiments of the present invention.

FIG. 3 is a drawing depicting additional details of the exemplary AM-EWOD device 36 in schematic perspective in accordance with embodiments of the present invention. The AM-EWOD device 36 has a lower substrate 44 with thin film electronics 46 disposed upon the lower substrate 44. The thin film electronics 46 are arranged to drive array element electrodes 48. A plurality of array element electrodes 48 are arranged in an electrode or element array 50, having X by Y array elements where X and Y may be any integer. A liquid droplet 52 which may include any polar liquid and which typically may be aqueous, is enclosed between the lower substrate 44 and a top substrate 54 separated by a spacer 56, although it will be appreciated that multiple liquid droplets 52 can be present.

FIG. 4 is a drawing depicting a cross section through some of the array elements of the exemplary AM-EWOD 36 device of FIG. 3. In the portion of the AM-EWOD device depicted in FIG. 4, the device includes a pair of the array element electrodes 48A and 48B that are shown in cross section that may be utilized in the electrode or element array 50 of the AM-EWOD device 36 of FIG. 3. The device configuration is similar to the conventional configuration shown in FIG. 1, with the AM-EWOD device 36 further incorporating the thin-film electronics 46 disposed on the lower substrate 44, which is separated from the upper substrate 54 by the spacer 56. The uppermost layer of the lower substrate 44 (which may be considered a part of the thin film electronics layer 46) is patterned so that a plurality of the array element electrodes 48 (e.g. specific examples of array element electrodes are 48A and 48B in FIG. 4) are realized. The term element electrode 48 may be taken in what follows to refer both to the physical electrode structure 48 associated with a particular array element, and also to the node of an electrical circuit directly connected to this physical structure. A reference electrode 58 is shown in FIG. 4 disposed upon the top substrate 54, but the reference electrode alternatively may be disposed upon the lower substrate 44 to realize an in-plane reference electrode geometry. The term reference electrode 58 may also be taken in what follows to refer to both or either of the physical electrode structure and also to the node of an electrical circuit directly connected to this physical structure.

Also similarly to the conventional structure of FIG. 1, in the AM-EWOD device 36, a non-polar fluid 60 (e.g. oil) may be used to occupy the volume not occupied by the liquid droplet 52. An insulator layer 62 may be disposed upon the lower substrate 44 that separates the conductive element electrodes 48A and 48B from a first hydrophobic coating 64 upon which the liquid droplet 52 sits with a contact angle 66 represented by θ. The hydrophobic coating is formed from a hydrophobic material (commonly, but not necessarily, a fluoropolymer). On the top substrate 54 is a second hydrophobic coating 68 with which the liquid droplet 52 may come into contact. The reference electrode 58 is interposed between the top substrate 54 and the second hydrophobic coating 68.

Figure 5B:
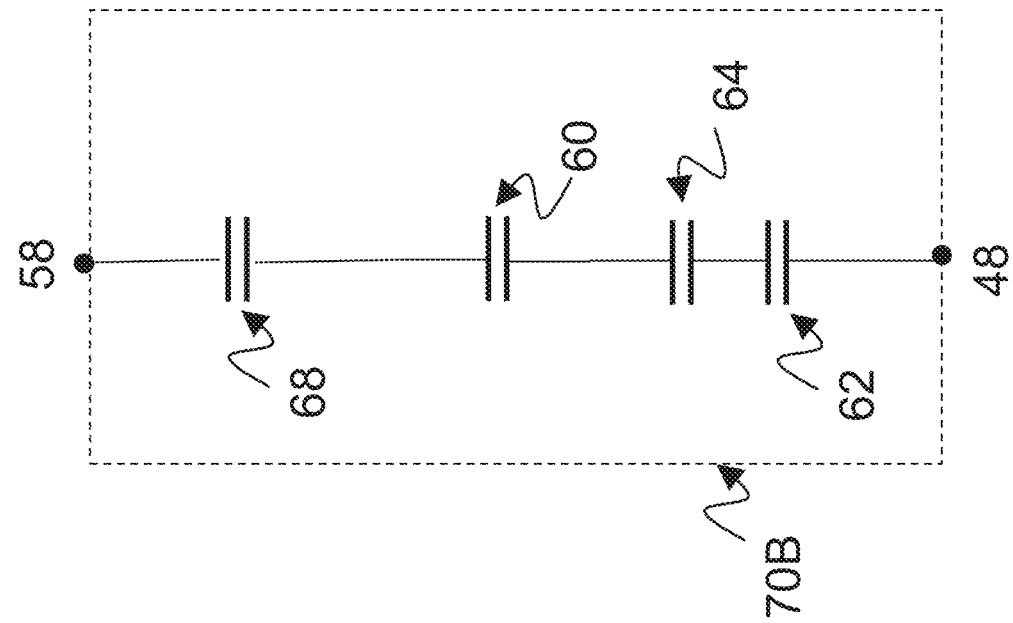
FIG. 5B is a drawing depicting a circuit representation of the electrical load presented at the element electrode when no liquid droplet is present.
Figure 5A:
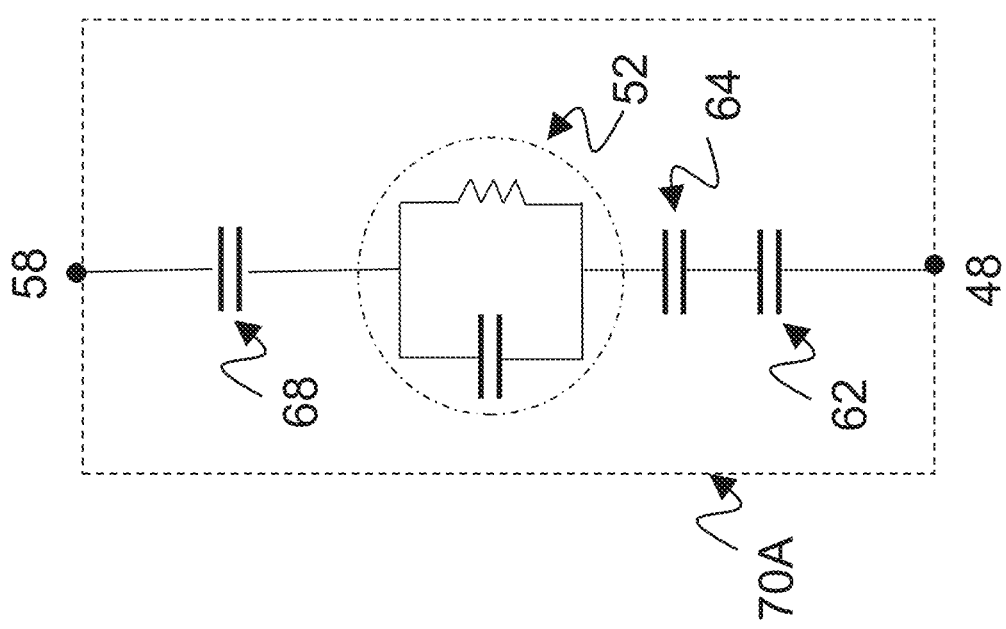
FIG. 5A is a drawing depicting a circuit representation of the electrical load presented at the element electrode when a liquid droplet is present.

FIG. 5A shows a circuit representation of the electrical load 70A between the element electrode 48 and the reference electrode 58 in the case where a liquid droplet 52 is present. The liquid droplet 52 can usually be modeled as a resistor and capacitor in parallel. Typically, the resistance of the droplet will be relatively low (e.g. if the droplet contains ions) and the capacitance of the droplet will be relatively high (e.g. because the relative permittivity of polar liquids is relatively high, e.g. ~80 if the liquid droplet is aqueous). In many situations the droplet resistance is relatively small, such that at the frequencies of interest for electro-wetting, the liquid droplet 52 may function effectively as an electrical short circuit. The hydrophobic coatings 64 and 68 have electrical characteristics that may be modelled as capacitors, and the insulator 62 may also be modelled as a capacitor. The overall impedance between the element electrode 48 and the reference electrode 58 may be approximated by a capacitor whose value is typically dominated by the contribution of the insulator 62 and hydrophobic coatings 64 and 68 contributions, and which for typical layer thicknesses and materials may be on the order of a pico-Farad in value.

FIG. 5B shows a circuit representation of the electrical load 70B between the element electrode 48 and the reference electrode 58 in the case where no liquid droplet is present. In this case the liquid droplet components are replaced by a capacitor representing the capacitance of the non-polar fluid 60 which occupies the space between the top and lower substrates. In this case the overall impedance between the element electrode 48 and the reference electrode 58 may be approximated by a capacitor whose value is dominated by the capacitance of the non-polar fluid and which is typically small, of the order of femto-Farads.

For the purposes of driving and sensing the array elements, the electrical load 70A/70B overall functions in effect as a capacitor, whose value depends on whether a liquid droplet 52 is present or not at a given element electrode 48. In the case where a droplet is present, the capacitance is relatively high (typically of order pico-Farads), whereas if there is no liquid droplet present the capacitance is low (typically of order femto-Farads). If a droplet partially covers a given electrode 48 then the capacitance may approximately represent the extent of coverage of the element electrode 48 by the liquid droplet 52.

FIG. 6 is a drawing depicting an exemplary arrangement of thin film electronics 46 in the exemplary AM-EWOD device 36 of FIG. 3 in accordance with embodiments of the present invention. The thin film electronics 46 is located upon the lower substrate 44. Each array element 51 of the array of elements 50 contains an array element circuit 72 for controlling the electrode potential of a corresponding element electrode 48. Integrated row driver 74 and column driver 76 circuits are also implemented in thin film electronics 46 to supply control signals to the array element circuit 72. The array element circuit 72 may also contain a sensing capability for detecting the presence or absence of a liquid droplet in the location of the array element. Integrated sensor row addressing 78 and column detection circuits 80 may further be implemented in thin film electronics for the addressing and readout of the sensor circuitry in each array element.

A serial interface 82 may also be provided to process a serial input data stream and facilitate the programming of the required voltages to the element electrodes 48 in the array 50. A voltage supply interface 84 provides the corresponding supply voltages, top substrate drive voltages, and other requisite voltage inputs as further described herein. A number of connecting wires 86 between the lower substrate 44 and external control electronics, power supplies and any other components can be made relatively few, even for large array sizes. Optionally, the serial data input may be partially parallelized. For example, if two data input lines are used the first may supply data for columns 1 to X/2, and the second for columns (1+X/2) to M with minor modifications to the column driver circuits 76. In this way the rate at which data can be programmed to the array is increased, which is a standard technique used in Liquid Crystal Display driving circuitry.

Generally, an exemplary AM-EWOD device 36 that includes thin film electronics 46 may be configured as follows. The AM-EWOD device 36 includes the reference electrode 58 mentioned above (which, optionally, could be an in-plane reference electrode) and a plurality of individual array elements 51 on the array of elements 50, each array element 51 including an array element electrode 48 and array element circuitry 72. Relatedly, the AM-EWOD device 36 may be configured to perform a method of actuating the array elements to manipulate liquid droplets on the array by controlling an electro-wetting voltage to be applied to a plurality of array elements to generate an electrowetting force. The applied voltages may be provided by operation of the control system described as to FIG. 2, including the control electronics 38 and applications and data stored on the storage device 40. The electro-wetting voltage at each array element 51 is defined by a potential difference between the array element electrode 48 and the reference electrode 58. The method of controlling the electro-wetting voltage at a given array element typically includes the steps of supplying a voltage to the array element electrode 48, and supplying a voltage to the reference electrode 58, by operation of the control system, thereby generating an appropriate electrowetting force for performing the desired droplet manipulation operations.

Figure 7:
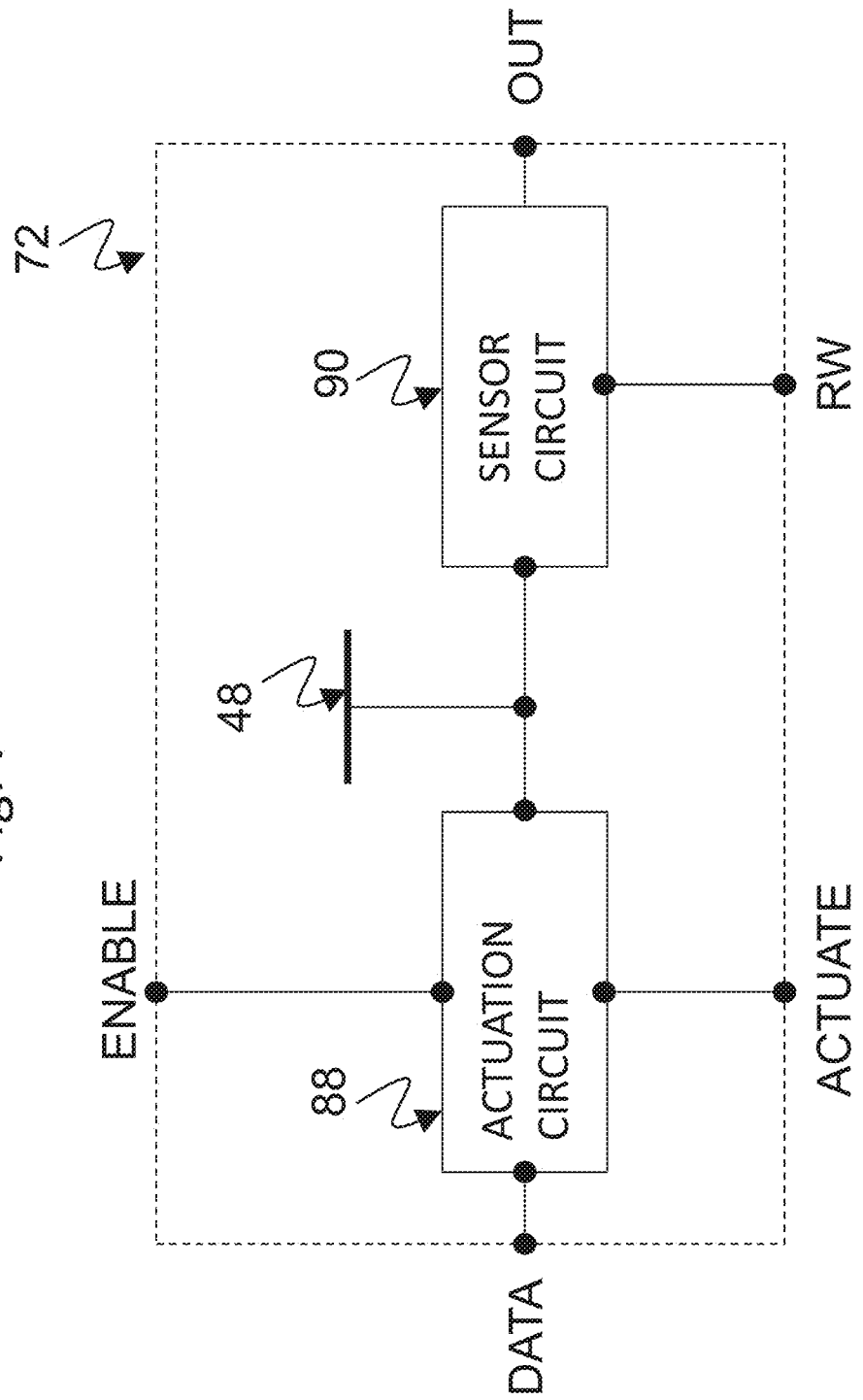
FIG. 7 is a drawing depicting an exemplary arrangement of the array element circuit in accordance with embodiments of the present invention.

FIG. 7 is a drawing depicting an exemplary arrangement of the array element circuit 72 present in each array element 51, in accordance with embodiments of the present invention. The array element circuit 72 may contain an actuation circuit 88, having inputs ENABLE, DATA and ACTUATE, and an output which is connected to an element electrode 48. The array element circuit 72 also may contain a droplet sensing circuit 90, which may be in electrical communication with the element electrode 48. Typically, the read-out of the droplet sensing circuit 90 may be controlled by one or more addressing lines (e.g. RW) that may be common to elements in the same row of the array, and may also have one or more outputs, e.g. OUT, which may be common to all elements in the same column of the array.

The array element circuit 72 may typically perform the functions of:
(i) Selectively actuating the element electrode 48 by supplying a voltage to the array element electrode. Accordingly, any liquid droplet present at the array element 51 may be actuated or de-actuated by the electrowetting force effect.
(ii) Sensing the presence or absence of a liquid droplet at the location of the array element 51. The means of sensing may be capacitive, optical, thermal or some other means. Capacitive sensing may be employed conveniently and effectively using an impedance sensor circuit as part of the array element circuitry.

Exemplary configurations of array element circuits 72 including impedance sensor circuitry are known in the art, and for example are described in detail in U.S. Pat. No. 8,653,832 referenced in the background art section, and commonly assigned UK application GB1500261.1, both of which are incorporated here by reference. These patent documents include descriptions of how the droplet may be actuated (by means of electro-wetting) and how the droplet may be sensed by capacitive or impedance sensing means.

Typically, capacitive and impedance sensing may be analogue and may be performed simultaneously, or near simultaneously, at every element in the array. By processing the returned information from such a sensor (for example in the application software in the storage device 40 of the reader 32), the control system described above can determine in real-time, or almost real-time the position, size, centroid and perimeter of each liquid droplet present in the array of elements 50. As referenced in connection with FIG. 2, an alternative to sensor circuitry is to provide an external sensor (e.g., sensor 35), such as an optical sensor that can be used to sense droplet properties.

The present invention provides enhanced control of the input of fluids into the EWOD device, including a non-polar fluid (oil) and one or more polar fluids that are formed into the liquid droplets for droplet manipulations by the electrowetting force. In exemplary embodiments, therefore, an EWOD device includes a first substrate assembly and a second substrate assembly spaced apart to define a channel between the first and second substrate assemblies; an input port in fluid communication with the channel, the input port defining an input well for receiving a fluid for inputting into the channel; and a control port in fluid communication with the channel, the control port defining a control well for receiving a fluid and having a seal that seals the control port in a sealed state in which fluid is restricted from entering the control well from the channel. When the seal is removed or pierced, the control port is placed in an unsealed state thereby permitting fluid to enter the control well from the channel.

Figure 8:
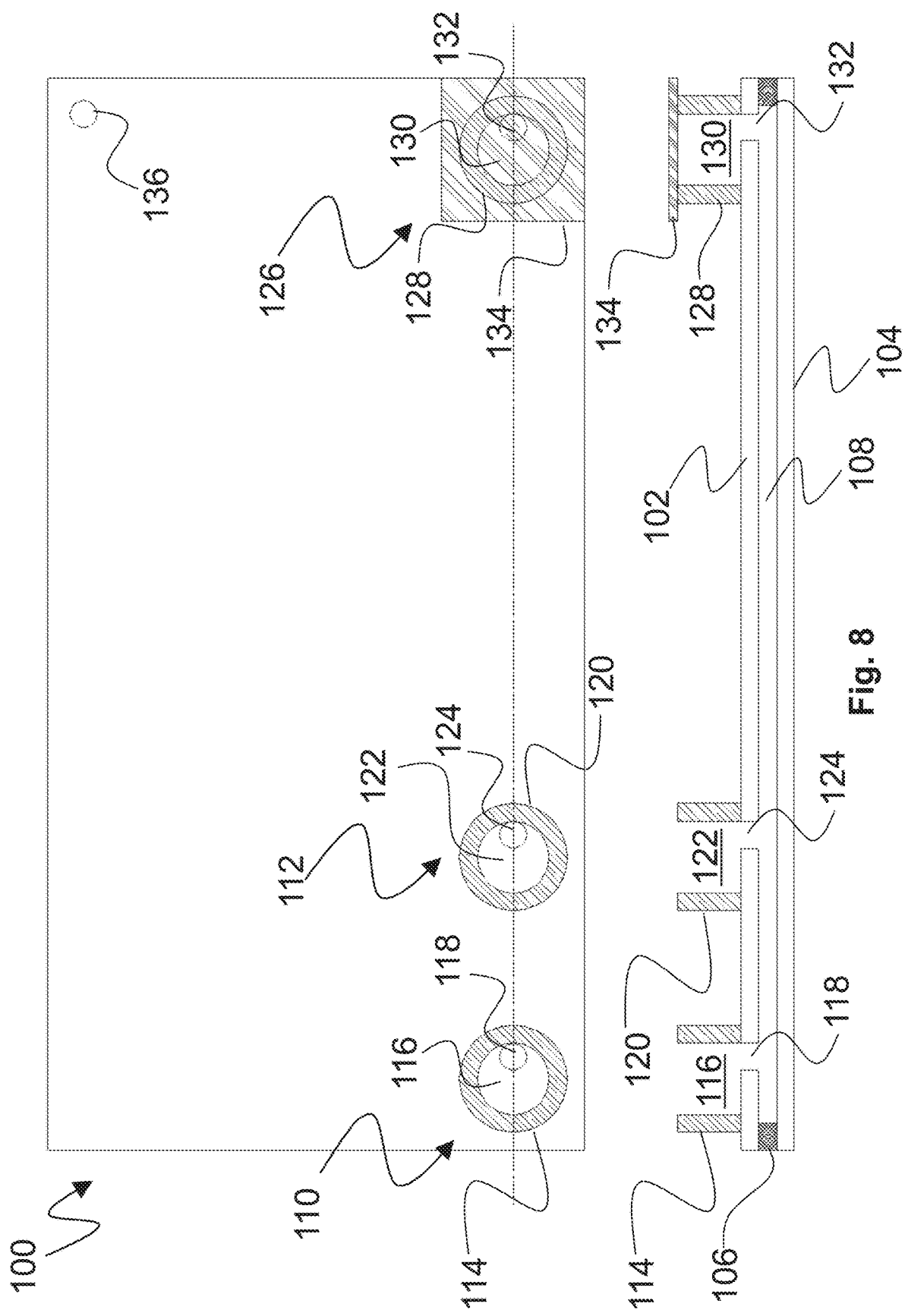
FIG. 8 is a drawing depicting a plan view and a side view of a first exemplary EWOD device in accordance with embodiments of the present invention.

FIG. 8 is a drawing depicting a plan view and a side view of an EWOD device 100 (which in particular may be an AM-EWOD device) in accordance with embodiments of the present invention. The EWOD device 100 may include a first (top) substrate assembly 102 and a second (bottom) substrate assembly 104 separated by a spacer 106, which define an EWOD channel 108. For simplicity of illustration of pertinent features, the individual layers of the EWOD device components are omitted. Accordingly, the first and second substrate assemblies may include the associated substrates, insulating layers, electrode layers, and related structures that form the EWOD device, such as for example the various components described with respect to FIGS. 3-7. Typically, the second (bottom) substrate assembly 104 constitutes the TFT substrate that would include the thin film electronics, with the first (top) substrate assembly 102 having the structures associated with inputting the fluids into the EWOD channel 108.

In the exemplary embodiment of FIG. 8, the EWOD device 100 includes a first fluid input port 110 and a second fluid input port 112. Although two input ports are shown in this example, any suitable number of inputs ports may be employed. The first input port 110 includes a first wall 114 that is adhered to an outer surface of the top substrate assembly 102 by any suitable means. Rigid plastic materials provide a suitable material for the wall 114. The wall 114 defines a first input well 116 in which an input fluid may be maintained. The first input well 116 is in fluid communication with a first channel port 118 that is configured as a hole that extends through the top substrate assembly 102. The hole may be formed by any suitable manufacturing process, such as drilling, stamping, cutting, or the like. The second input port 112 may be configured comparably as the first input port 110. Thus, the second input port 112 may include a second wall 120 that is adhered to an outer surface of the top substrate assembly 102, and that defines a second input well 122 in which an input fluid may be maintained. The second input well 122 is in fluid communication with a second channel port 124 that likewise is configured as a hole that extends through the top substrate assembly 102. In this example, the first and second input ports essentially are identical, although as further detailed below, the first and second input ports may have different configurations.

The EWOD device 100 further includes a control port 126, which in certain respects is configured comparably as the two input ports. Accordingly, the control port 126 includes a control wall 128 that is adhered to an outer surface of the top substrate assembly 102 by any suitable means. As above, rigid plastic materials provide a suitable material for the control wall 128. The control wall 128 defines a control well 130 that is in fluid communication with an exit port 132 that is configured as a hole that extends through the top substrate assembly 102. As above, the hole for the exit port may be formed by any suitable manufacturing process, such as drilling, stamping, cutting, or the like. Under certain conditions, which are described in more detail below, fluid can exit from the EWOD channel through the exit port 132 into the control well 130. The control port 126 further includes a seal 134 that is fixed to the control wall 128 to seal the control well 130 relative to the exterior of the EWOD device. The seal 134 may be removed or pierced to break such seal. The seal 134 thus may be made of any suitable material that can be removed or pierced, such as various tape materials, elastomeric materials that are adhered to the control wall, plastic cap materials, and the like. Tape materials are particularly suitable because they can be readily removed and replaced over multiple uses.

In this example, inner surfaces of the walls 114 and 120 coincide with boundaries of the respective channel ports 118 and 124. Similarly, an inner surface of the control wall 128 coincides with a boundary of the exit port 132. Such a configuration disrupts surface tension of a fluid located within the EWOD channel that is exposed to the channel ports and/or the exit port. As detailed below, disruption of the surface tension aids in providing a controlled input of fluids from the input ports through into the EWOD channel via the channel ports.

The EWOD device 100 further includes a vent port 136 that is configured as another hole that extends through the top substrate assembly 102. As above, the hole for the vent port may be formed by any suitable manufacturing process, such as drilling, stamping, cutting, or the like. The vent port 136 permits air to vent from the EWOD channel as fluid enters the EWOD channel, and thus prevents air from becoming trapped inside the EWOD channel.

FIGS. 9-14 are drawings that illustrate a basic exemplary operation of the EWOD device 100 to demonstrate a method for controlling fluid flow through the EWOD device. The structural variations of the EWOD device illustrated in FIGS. 15-26 will operate comparably except as otherwise described.

Figure 9:
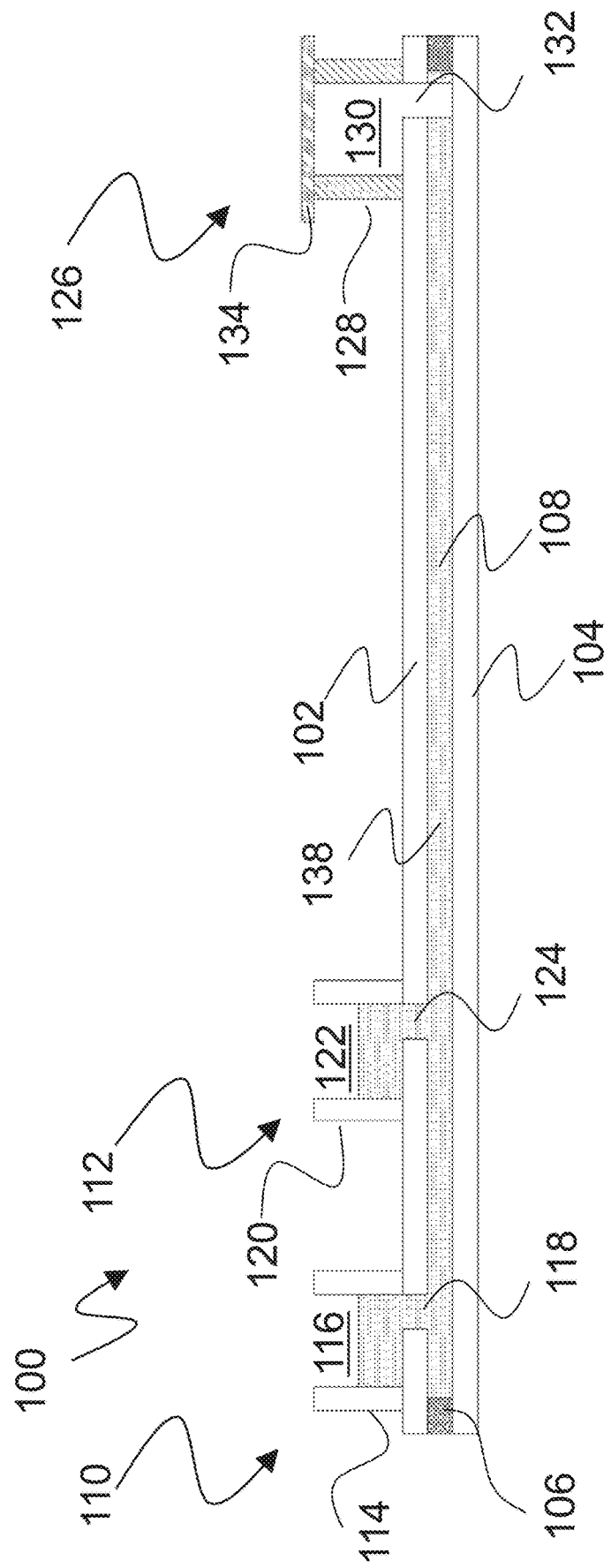
FIG. 9 is a drawing depicting a first step of operating an EWOD device including inputting oil into the EWOD channel of the EWOD device.

FIG. 9 depicts a first step of inputting oil into the EWOD device, and into the EWOD channel 108 in particular. As seen in FIG. 9, a non-polar fluid or oil 138 is inputted into the EWOD channel 108 via at least one of the fluid input ports by any suitable means. Oil will continue to fill the EWOD channel 108 until the EWOD channel is filled. As more oil is inputted into the device, excess oil that cannot enter the EWOD channel will enter and begin to accumulate within the first and second input ports 110 and 112 (i.e., the input wells 116 and 122 begin to fill with oil). Because of air trapped within the control port 126 due to the seal 134, oil is prevented under the pressure of the trapped air from entering the control well 130. In addition, oil may enter the vent port 136 but will tend not to spill over onto the top substrate due to surface tension of the oil. In contrast, surface tension of the oil at the input ports is disrupted by the configuration referenced above by which the walls 114 and 120 coincide with boundaries of the respective channel ports 118 and 124. With the surface tension disrupted, oil is permitted to accumulate within the input ports 110 and 112 as referenced above. When the oil input process is complete, levels of oil within the input ports 110 and 112 will equalize as shown in FIG. 9.

Figure 10:
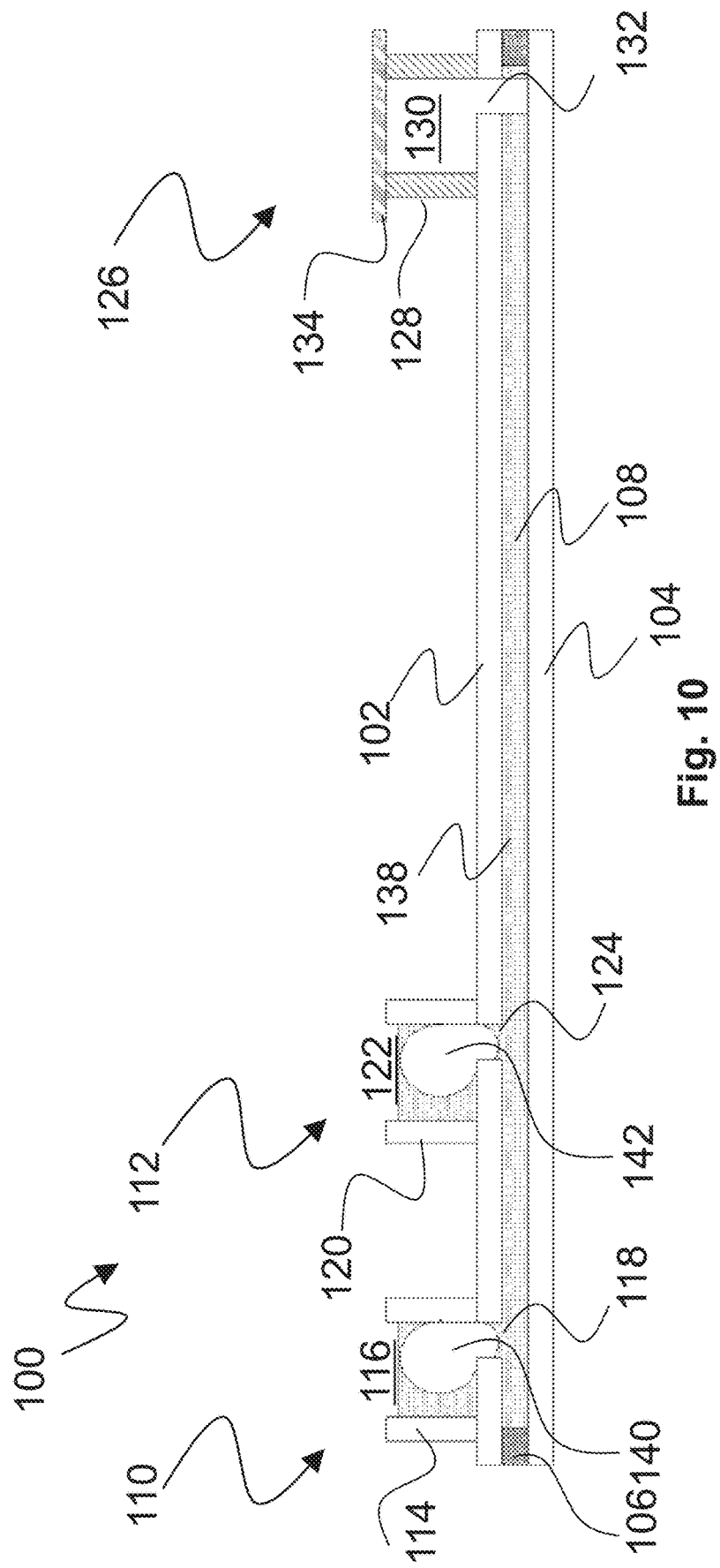
FIG. 10 is a drawing depicting a second step of operating an EWOD device including inputting a polar fluid into the EWOD device.

FIG. 10 depicts a second step of inputting the polar fluid into the EWOD device for the generation of droplets for manipulation. As seen in FIG. 10, a first fluid reservoir of polar fluid 140, used for forming liquid droplets for droplet manipulations, is input into at least one of the fluid input ports, for example input port 110. A second fluid reservoir of polar fluid 142 similarly may be input into another one of the fluid input ports, for example input port 112. It will be appreciated that either one, or both, of the input ports may be used to introduce the polar fluid into the EWOD device, and the polar fluid inputted via the input port 110 versus the input port 112 may be the same fluid or different fluids.

Typically, a device operator uses a pipette to input polar fluid into the input ports 110 and/or 112 at a location adjacent to the respective channel port, e.g., channel port 118 and/or channel port 124. The polar fluid 140/142 typically is denser than the oil 138, so the pipetting action displaces the oil from the area adjacent to the channel ports 118 and 124 as shown in FIG. 10. Due to the polar nature of such fluid 140 and 142, the polar fluid will tend to repel from the hydrophobic inner surface of the top substrate assembly 102 that defines the EWOD channel 108, and also does not mix with the nonpolar fluid or oil 138. The displacement results in the oil levels in the input wells rising. Furthermore, the presence of the seal prevents any displacement of the oil into the control port 126 that could permit entry of the polar fluid into the EWOD channel. The polar fluid 140 and 142, therefore, will tend to coalesce into a discrete, essentially spherical reservoir confined to the pipetting target area adjacent to the channel ports 118 and 124. Such state may be referred to as a fluid holding state in that the polar fluid is held back within the input wells 116 and 122. The fluid holding state is highly stable, and the polar fluid tends to remain in such state even if an electrowetting voltage is applied. Accordingly, there is little to no leakage of the polar fluid 140 and 142 into the EWOD channel 108 during the fluid holding state, and the polar fluid maintains its position in the area of the channel ports.

The potential for such leakage may increase depending upon the precise makeup of the polar fluid. In particular, if the polar fluid contains a surfactant, a small fraction of the polar fluid may enter the EWOD channel, but such amounts do not undermine the device performance and is accommodated in subsequent steps. Accordingly, in most cases the amount of leakage into the EWOD channel will be essentially nil, and even when the polar fluid includes a surfactant, any leakage amounts to a small fraction such that the polar fluid at least substantially remains within the input wells 166 and 122 of the respective input ports 110 and 112, adjacent to the corresponding channel ports 118 and 124. The polar fluid thus remains as essentially a spherical reservoir at each of the channel ports.

Figure 11:
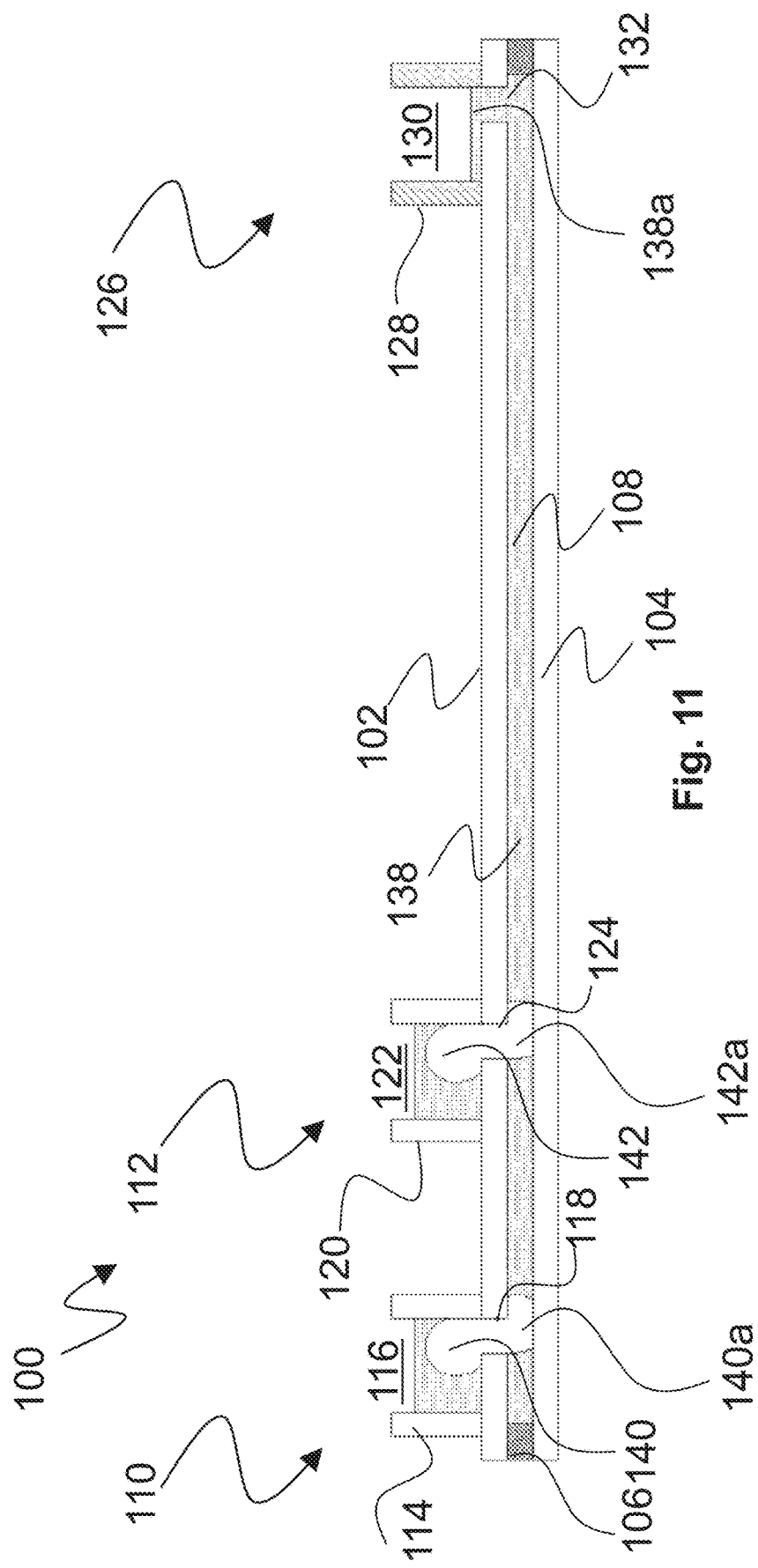
FIG. 11 is a drawing depicting a third step of operating an EWOD device including piercing a seal of a control port in the EWOD device.

Because of the presence of the seal 134, fluid from the polar fluid reservoirs 140 and 142 substantially does not enter the EWOD channel 108 during the fluid holding state at this point even if an electrowetting force is applied to the fluid in the input ports. FIG. 11 depicts a third step of piercing or removing the seal 134, which results in the polar fluid being drawn into the EWOD channel for the generation of droplets for manipulation. This state of fluid entering the EWOD channel is referred to as a fluid input state. The fluid input state thus is initiated by removing the seal 134 to place the control port in an unsealed state, by which a portion of the oil or non-polar fluid flows through the exit port 132 and into the control well 130 of the control port 126, either by actually removing the seal or at least piercing the seal to render the control port in an unsealed state. Accordingly, polar fluid input into the EWOD channel is initiated by removing or piercing the seal on the control port to place the control port in an unsealed state, and this results in an automatic internal displacement of oil into the control well of the control port.

More particularly, when the seal 134 is removed or pierced, the system tries to balance the difference in the head of pressure of the input and control ports. Oil 138a is displaced into control port 126, and so there is now space inside the EWOD channel 108 to bring the polar fluid into the EWOD channel, as identified in the figures by reference numerals 140a and 142a. Input of the polar fluid into the EWOD channel is initiated by applying the appropriate electrowetting force. As referenced above, polar fluids generally resist entry into the EWOD channel due to the hydrophobic surfaces on the inner surface of the top substrate assembly 102. Accordingly, the system can be stable as shown in FIG. 11 with a misbalance in head pressure, by which the overall fluid levels in the input ports 110 and 112 is higher than the oil level in the control port 126.

Accordingly, when there are multiple fluid input ports being employed, the method of controlling fluid flow further may include the steps of: inputting polar fluid into the first input well to form a first fluid reservoir at a first channel port that fluidly connects the first input well to the channel, and inputting polar fluid into the second input well to form a second fluid reservoir at a second channel port that fluidly connects the second input well to the channel. When the seal is removed or pierced to place the control port in the unsealed state and a portion of the non-polar fluid reservoir within the channel displaces from the channel into the control well, a portion of the polar fluid from each of the first and second fluid reservoirs enters the channel respectively from the first and second input wells. The first fluid reservoir and the second fluid reservoir may contain either the same or different polar fluids. It will be appreciated that although two fluid input ports are employed in this example, any suitable number may be used as may be warranted for any given application.

Figure 12:
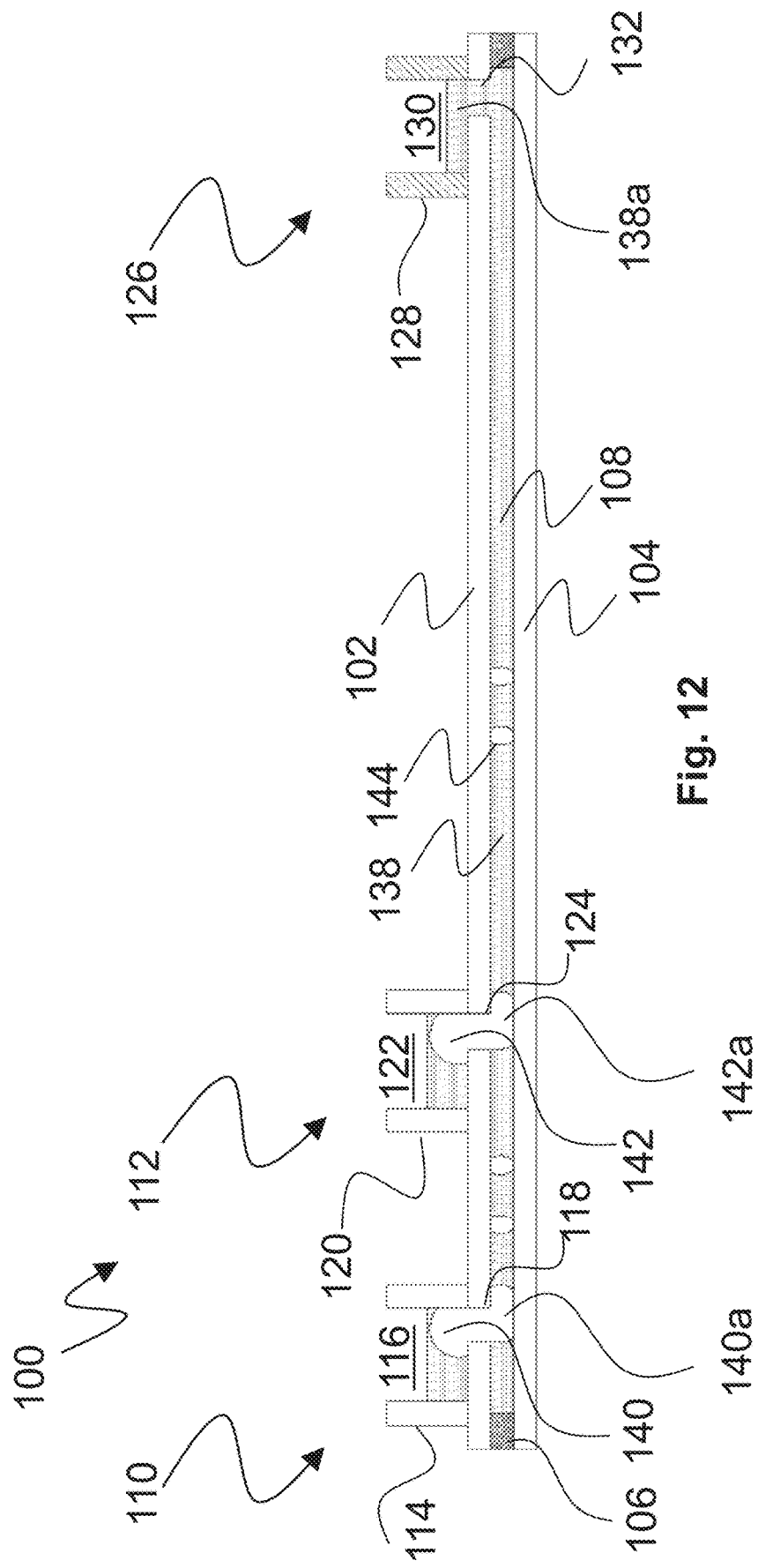
FIG. 12 is a drawing depicting a fourth step of operating an EWOD device including using electrowetting to input droplets of polar fluid into the EWOD channel of the EWOD device.

FIG. 12 depicts a fourth step of employing electrowetting forces to generate droplets for manipulation. Referring to FIG. 12, the electrowetting mechanism is used to dispense droplets 144 from the input fluid reservoirs 140 and 142 into the EWOD channel 108 in a controlled manner under software control executed by the EWOD device control system. Any suitable number of droplets may be generated, from any number of multiple fluid input ports into which polar fluid reservoirs are introduced. The total volume of fluid that can enter the EWOD channel, including any suitable number of droplets input from any of the fluid input ports, generally is determined by the quantity of oil 138a displaced from the channel by the removal or piercing of the control port seal.

In exemplary embodiments, when it is desired to input an additional volume of polar fluid that exceeds a maximum that can be handled within the EWOD channel at any one time, the processed polar fluid is extracted to ready the device for input of additional polar fluid into the EWOD channel. This may be accomplished by performing the following additional steps, and multiple cycles of polar fluid input/droplet manipulation/polar fluid extraction may be repeated.

Figure 13:
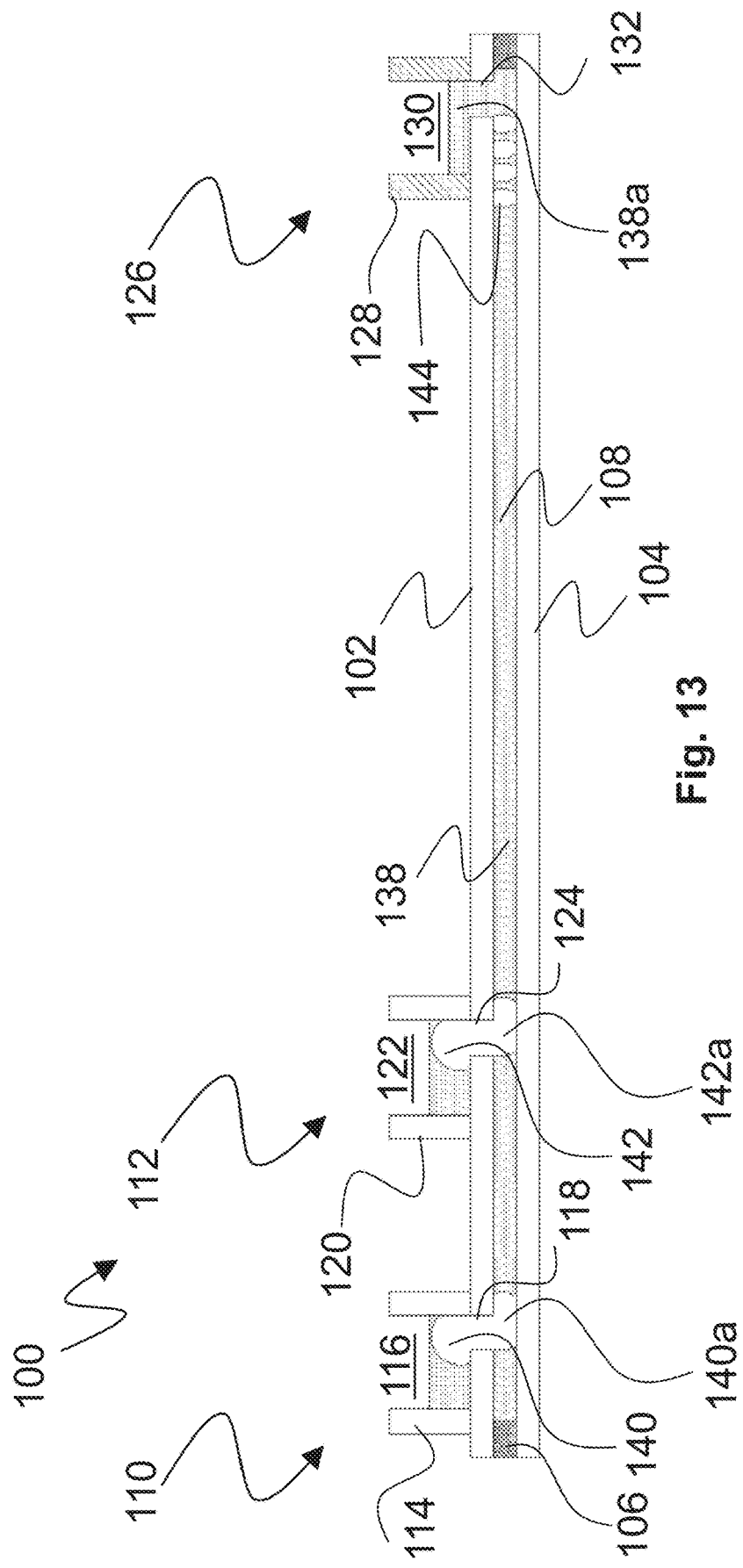
FIG. 13 is a drawing depicting a fifth step of operating an EWOD device including moving dispensed droplets to an exit port of the EWOD device.
Figure 14:
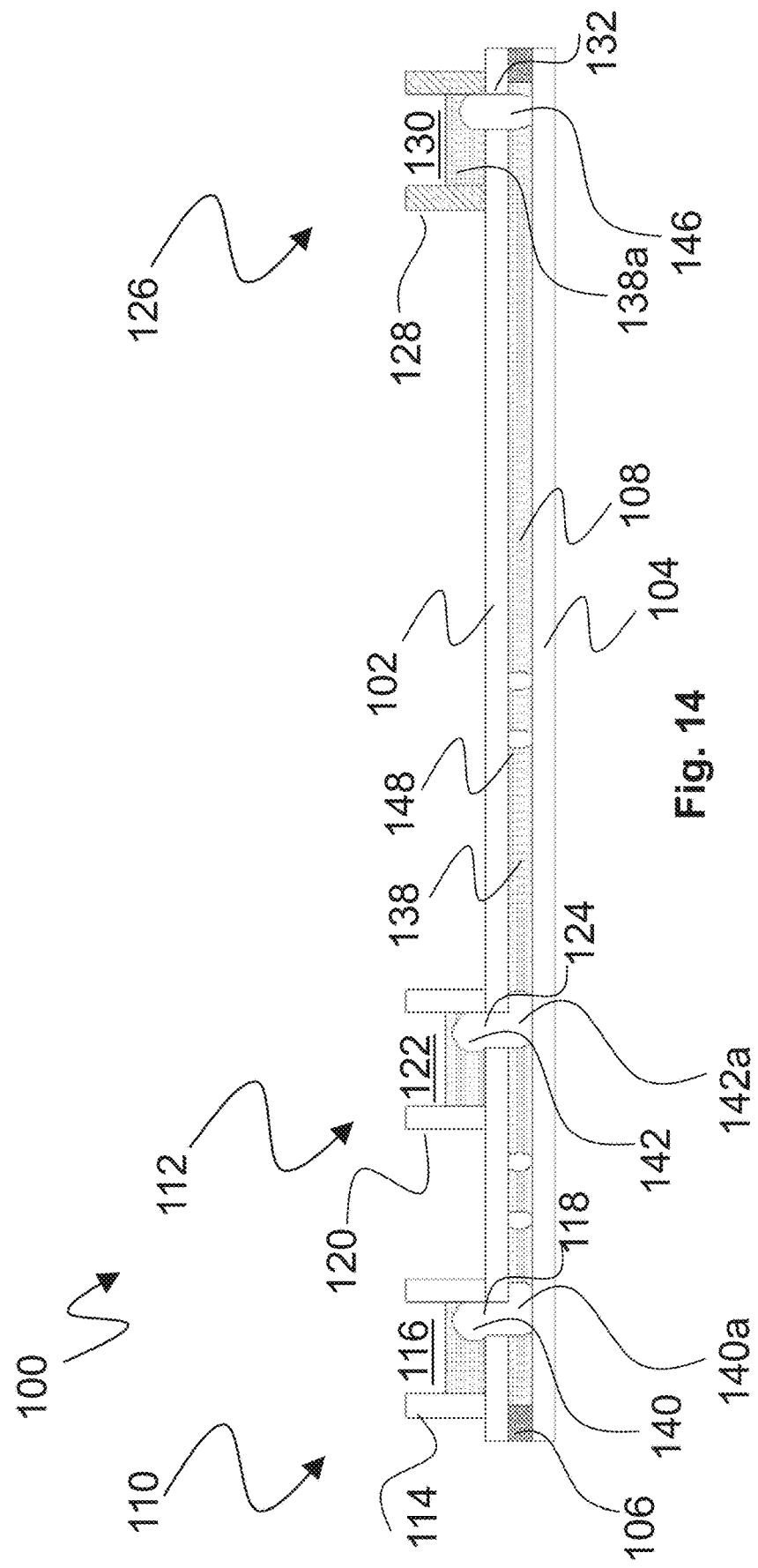
FIG. 14 is a drawing depicting a sixth step of operating an EWOD device including moving a reservoir of dispensed droplets through the exit port of the EWOD device.

FIG. 13 therefore depicts a fifth step of using the electrowetting mechanism to move the dispensed droplets 144 to an exit port, which in exemplary embodiments may be the exit port 132 of the control port 126 (although a different port may be provided as a dedicated exit port). FIG. 14 depicts a sixth step of removing the processed polar fluid from the EWOD channel, through the exit port 132 and into the control well 130 of the control port 126. As shown in FIG. 14, the dispensed droplets may be combined into an exit reservoir 146 for removal from the EWOD channel into the control well 130. At this step, the electrowetting force is deactivated in the region of the exit port 132, and the fluid leaves the EWOD channel and enters the control well 130 through the exit port under the hydrostatic pressure and by repulsion by the hydrophobic nature of the substrate layers that define the EWOD channel. Additional droplets 148 then may be dispensed from the fluid reservoirs 140 and/or 142 and inputted into the EWOD channel using the electrowetting mechanism, by exploiting the volume displaced within the EWOD channel by the extraction of exit fluid reservoir 146 at the exit port 132. Again, multiple cycles of polar fluid input/droplet manipulation/polar fluid extraction may be repeated to perform complex reaction protocols.

The present invention has advantages over conventional filling mechanisms such as those described in the background section. U.S. Pat. No. 9,630,180 uses the hydrostatic head of pressure of the droplet actuator to allow fluid into the EWOD channel between the bottom and top substrates. Such device does not use a seal to create a large difference in hydrostatic pressure, and there is presumably a limit to the quantity of fluid that can be drawn on in this manner. WO 2017/047082 describes filling the device with oil, adding fluid to the input ports, and then then extracting a sufficient volume of oil to enable at least some of the fluid to enter the device. There is a limit to the quantity of fluid which can be processed by such a device, as it is determined by the amount of oil being extracted. This patent document does not recognize the potential for over filling the device and does not provide for any automated input of the polar fluid. Accordingly, the conventional configurations cannot remove oil and then load polar fluid for droplets into the EWOD channel, and then extract fluid from the device for subsequent input of additional polar fluid for droplets, in a controlled and automated manner with the use of a seal to initiate the fluid input.

In the system described herein, the system is stable in the fluid holding state until the user removes the seal from the control port to initiate the fluid input state. Sealing the control port creates a large difference in hydrostatic pressure between the input ports and the control port. When the seal is removed or pierced to place the control port in the unsealed state, the system tries to balance the hydrostatic pressure between the control port and the input ports. Oil then moves quickly into the control well of the control port, which allows the polar fluid to be inputted into, and to be removed from, the device efficiently and in a highly-controlled manner when the electrowetting force is applied.

Subsequent figures illustrate structural variations to the above. For ease of illustration, like structures are identified with like reference numerals as in the previous figures and generally are comparably configured. Additional explanation is provided as to the structural differences among the various embodiments. Relatedly, the various embodiments of the EWOD device generally will operate as described above, with certain modifications based on the structural variations as detailed below.

Figure 15:
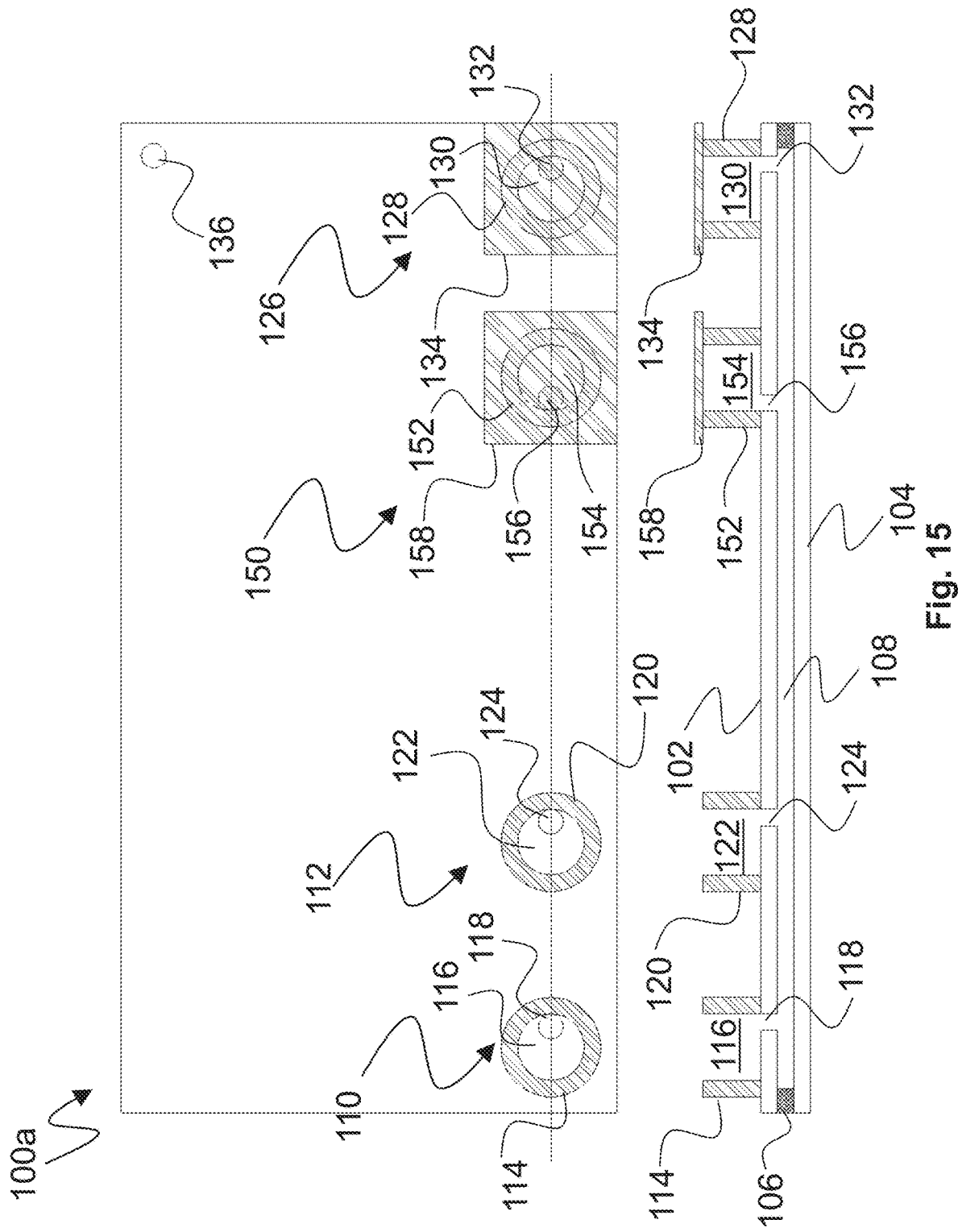
FIG. 15 is a drawing depicting a plan view and a side view of a second exemplary EWOD device in accordance with embodiments of the present invention.

FIG. 15 is a drawing depicting a plan view and a side view of an EWOD or AM-EWOD device 100a in accordance with another embodiment of the present invention. In this embodiment, there are two independent control ports, including the first control port 126 as described above, and a second control port 150 which may be similarly configured as the first control port 126. Accordingly, the second control port 150 includes a second control wall 152 that is adhered to an outer surface of the top substrate assembly 102 by any suitable means. As above, rigid plastic materials provide a suitable material for the second control wall 152. The second control wall 152 defines a second control well 154 that is in fluid communication with a second exit port 156 that is configured as a hole that extends through the top substrate assembly 102. The second control port 150 further includes a second seal 158 that is fixed to the second control wall 152 to seal the second control well 154 relative to the exterior of the EWOD device. The second seal 158 may be removed or pierced comparably as the first seal 134 to break such seal. The second seal likewise may be made of any suitable material that can be removed or pierced, such as various tape materials, elastomeric materials that are adhered to the control wall, plastic cap materials, and the like. Tape materials are particularly suitable because they can be readily removed and replaced over multiple uses.

The control ports 126 and 150 are operable independently of each other, and as such the seals 134 and 158 can be removed or pierced at different times as desired for any particular application. This allows more precise control over the rate at which fluids can be drawn into the EWOD channel. Operation proceeds as is described in connection with the first embodiment, but now a greater volume of oil can be displaced out of the system because two control ports may take up displaced oil through the independent exit ports 132 and 156. This in turn allows more polar fluid to be drawn into the EWOD channel using the electrowetting mechanism. Although this embodiment incorporates two independent control ports, any suitable number of independent control ports may be employed. Accordingly, when multiple independent control ports are used, the method of controlling fluid flow further may include the steps of: removing or piercing the first seal to place the first control port in an unsealed state, wherein a portion of the non-polar fluid within the channel is displaced from the channel into the first control well and a first draw of the polar fluid reservoir enters the channel from the input well; and removing or piercing the second seal to place the second control port in an unsealed state, wherein an additional portion of the non-polar fluid within the channel is displaced from the channel into the second control well and a second draw of the polar fluid reservoir enters the channel from the input well.

Figure 16:
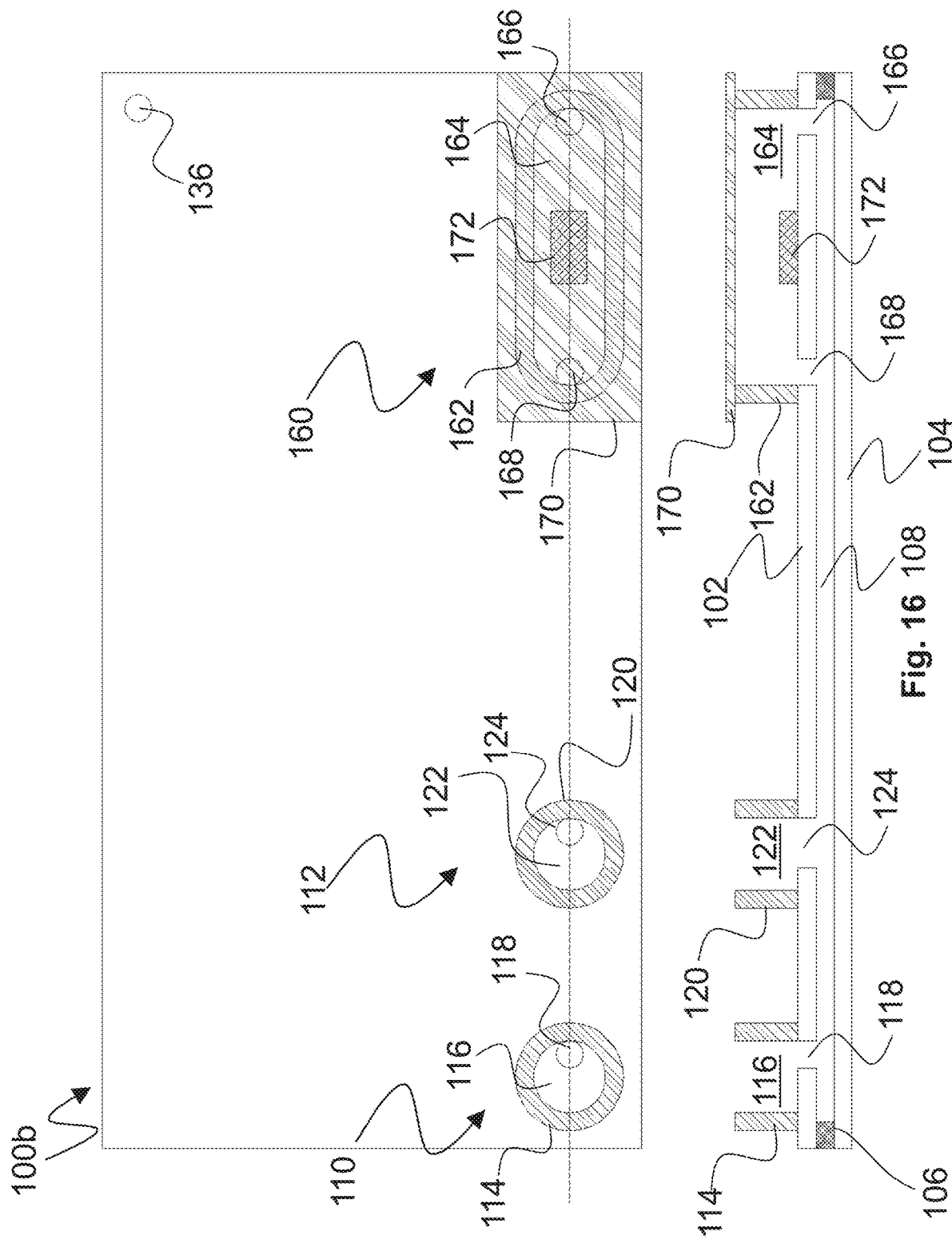
FIG. 16 is a drawing depicting a plan view and a side view of a third exemplary EWOD device in accordance with embodiments of the present invention.

FIG. 16 is a drawing depicting a plan view and a side view of an EWOD or AM-EWOD device 100b in accordance with another embodiment of the present invention. In this embodiment, an enlarged control port structure encompasses two dependent exit ports. The exit ports are linked so that when the seal is removed a larger volume of oil can be displaced out of the system, which permits more polar fluid to be drawn into the EWOD channel using the electrowetting mechanism.

Referring to FIG. 16, a control port structure 160 includes an enlarged control wall 162 that is adhered to an outer surface of the top substrate assembly 102 by any suitable means. As above, rigid plastic materials provide a suitable material for the enlarged control wall 162. The enlarged control wall 162 defines an enlarged control well 164 that is in fluid communication with a plurality of exit ports that fluidly connect the control well to the channel, such as for example a first exit port 166 and a second exit port 168 that each is configured as a hole that extends through the top substrate assembly 102. The control port structure 160 further includes a seal 170 that is fixed to the control wall 162 to seal the control well 164 relative to the exterior of the EWOD device. The seal 170 may be removed or pierced comparably as the seals in the previous embodiments to break the sealed state. When the seal is removed or pierced, both exit ports 166 and 168 provide pathways for fluid to exit from the EWOD channel 108, so as to fill the enlarged control well 164. With the two exit ports linked via the enlarged control well 164, a greater amount of oil can be displaced within a given time. Any number of enlarged control port structures with linked or dependent exits ports may be provided, and/or may be combined with any suitable number of independent control ports as described in connection with previous embodiments.

As another feature of the example of FIG. 16, the control port structure 160 further may include at least one absorbent layer 172 located in the control well for absorbing fluid that enters the control well. The absorbent layer may be configured as an absorbent pad or wick. The absorbent layer 172 may be made of a suitable material for absorbing or wicking up fluid, and particularly the non-polar oil that is displaced when the seal is removed or pierced. The absorbent layer allows more oil to be displaced out of the EWOD channel, which in turn permits more polar fluid to be inputted into the EWOD channel. The absorbent layer 172 further determines the rate at which the oil is displaced by virtue of the rate of absorption.

Figure 17:
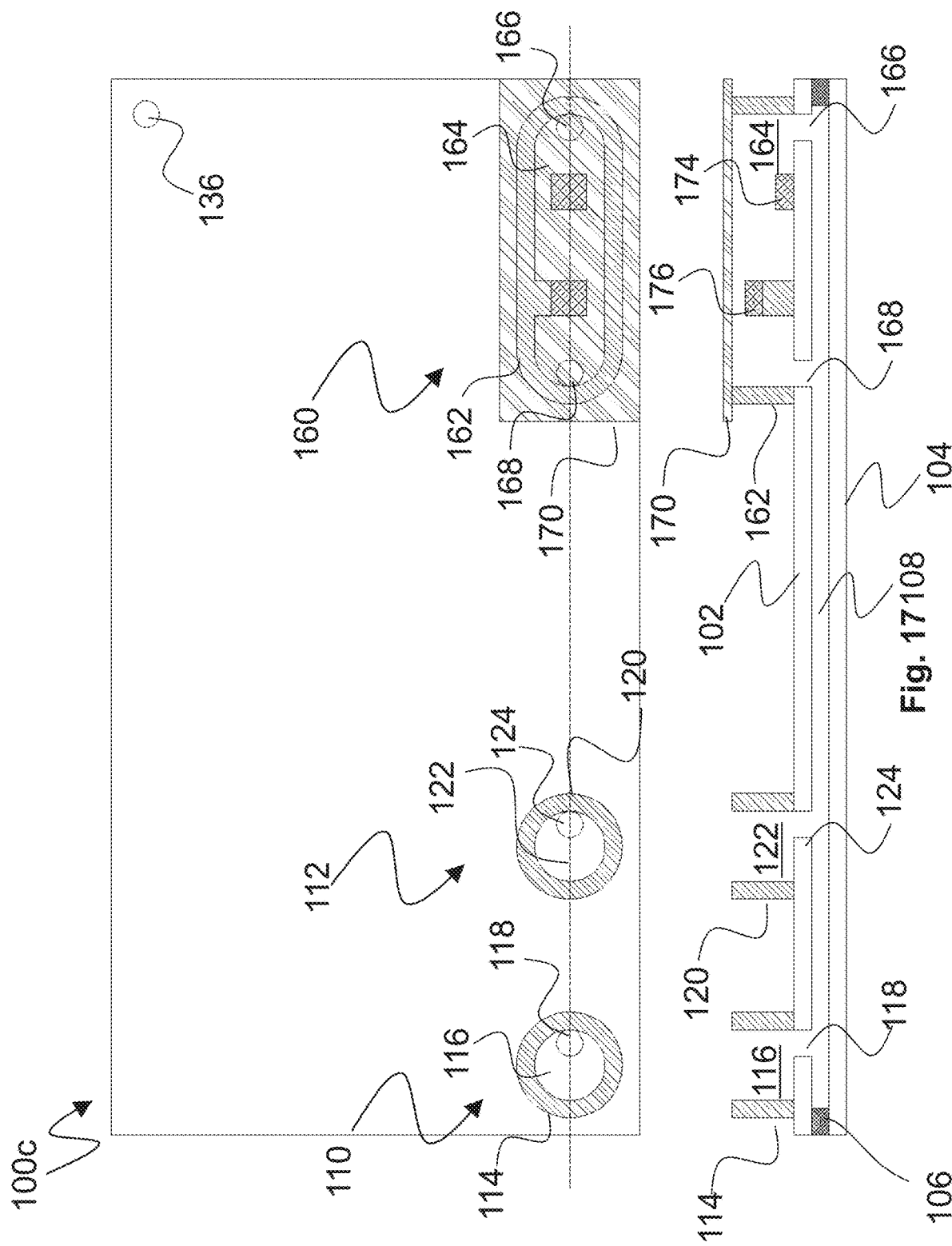
FIG. 17 is a drawing depicting a plan view and a side view of a fourth exemplary EWOD device in accordance with embodiments of the present invention.

FIG. 17 is a drawing depicting a plan view and a side view of an EWOD or AM-EWOD device 100c in accordance with another embodiment of the present invention. This is a variant of the previous embodiment of FIG. 16, except in this embodiment there is a plurality of absorbent layers 174 and 176, which again may be configured as absorbent pads or wicks. In this example, two absorbent layers are shown, although any suitable number of absorbent layers may be employed. The absorbent layers 174 and 176 may be located at different positions within the control well 164 of the control port structure 160, such as for example at different heights as shown in FIG. 17. When the seal is removed or pierced, the first absorbent layer 174 creates an initial draw of fluid out of the EWOD channel. As fluid continues to fill the control port structure, the fluid reaches a point at which the fluid is absorbed by the second absorbent layer 176. The second absorbent layer creates an additional draw of fluid and thereby increases the speed that the polar fluid can be brought into the EWOD channel. The first and second absorbent layers 174 and 176 may have different absorption capacities and/or different rates of absorption to provide for precise fluid control as warranted for a particular application.

Figure 18:
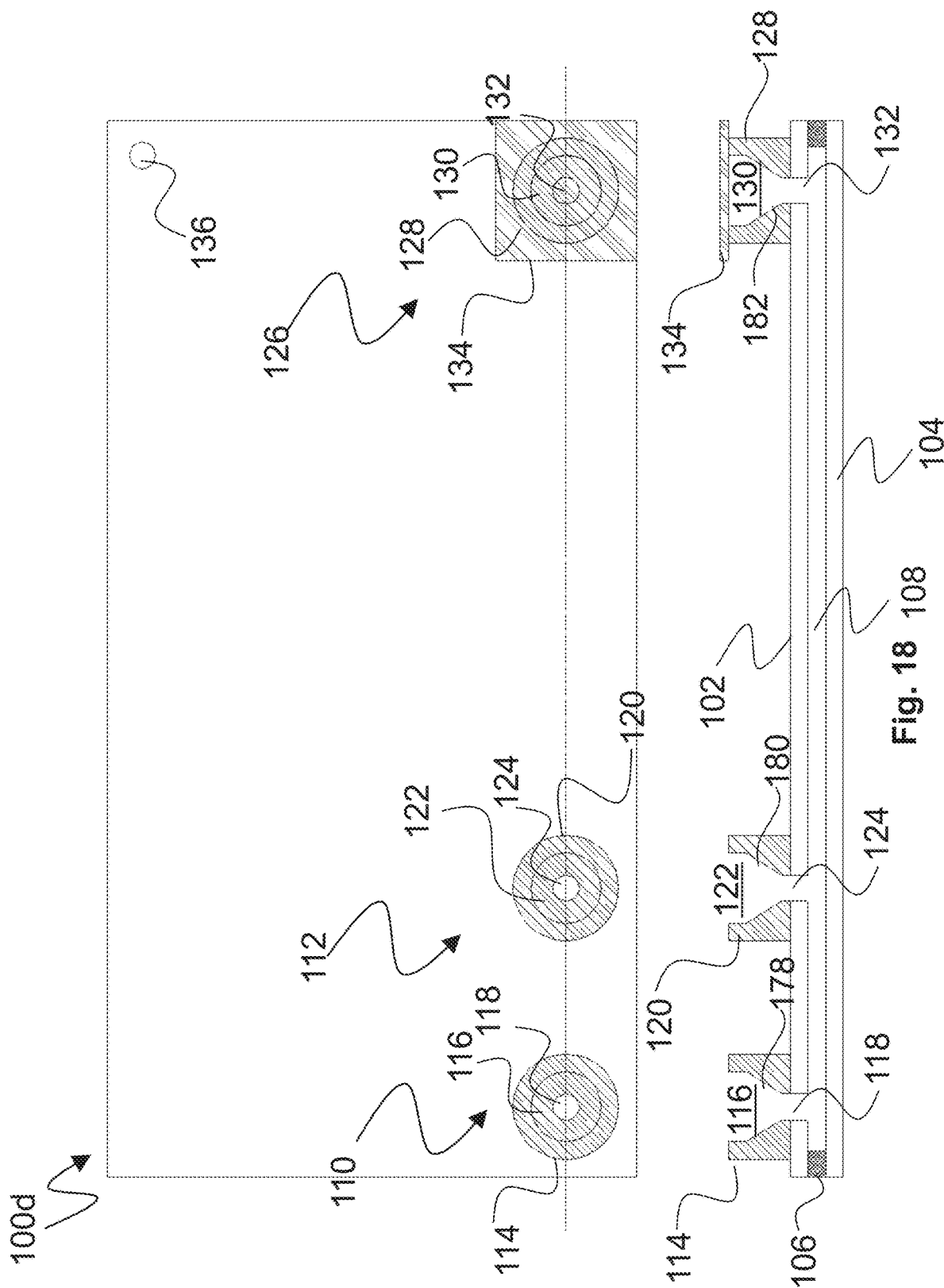
FIG. 18 is a drawing depicting a plan view and a side view of a fifth exemplary EWOD device in accordance with embodiments of the present invention.

FIG. 18 is a drawing depicting a plan view and a side view of an EWOD or AM-EWOD device 100d in accordance with another embodiment of the present invention. In this variation, the input walls 114 and 120 of the input ports 110 and 112 each respectively has a tapered inner surface 178 and 180 that tapers toward the respective channel port. Similarly, a control wall 128 of the control port 126 has a tapered inner surface 182 that tapers toward the exit port. As in previous embodiments, the walls remain aligned with the boundaries of the channel ports and exit port so as to disrupt the surface tension of the fluid within the EWOD channel. The tapered shape ensures that the polar fluid is precisely situated at the channel ports 118 and 124 when pipetted into the device, and more precisely directed out from the EWOD channel through the exit port 132. This provides another design feature for enhancing control of fluid into and out from the EWOD channel.

Figure 19:
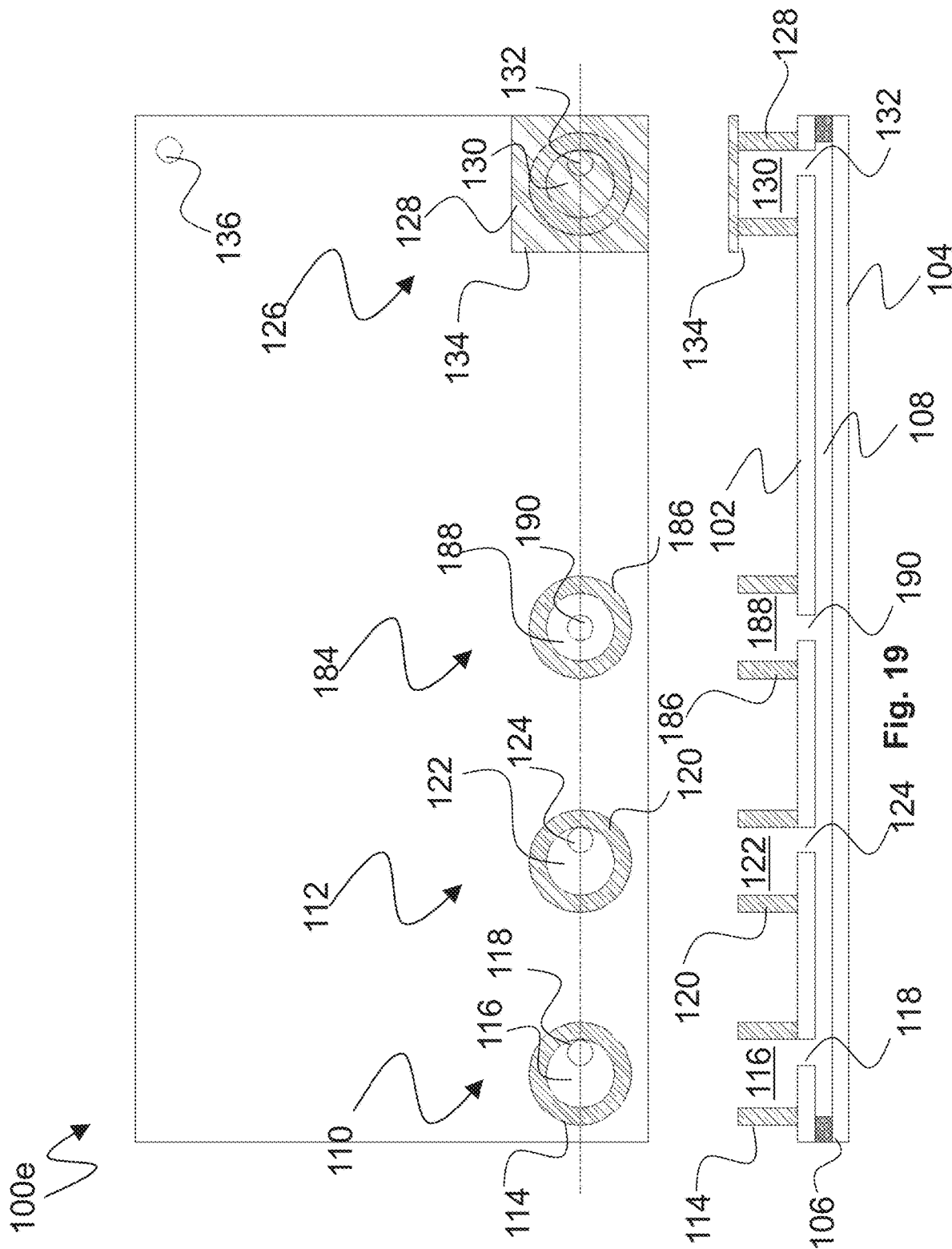
FIG. 19 is a drawing depicting a plan view and a side view of a sixth exemplary EWOD device in accordance with embodiments of the present invention.

FIG. 19 is a drawing depicting a plan view and a side view of an EWOD or AM-EWOD device 100e in accordance with another embodiment of the present invention. In this variation, there is a third fluid input port 184 in addition to the input ports 110 and 112. The third input port 184 includes a third wall 186 that is adhered to an outer surface of the top substrate assembly 102 by any suitable means. The third wall 186 defines a third input well 188 in which an input fluid may be maintained. The third input well 188 is in fluid communication with a third channel port 190 that is configured as a hole that extends through the top substrate assembly 102.

In this example, the first and second input ports 110 and 112 operate comparably as in previous embodiments. Because the walls 114 and 120 coincide with the boundaries of the channel ports 118 and 124, surface tension is disrupted as referenced above, and the first and second input ports may fill with oil. The first and second input ports also can hold a larger volume of polar fluid for generating liquid droplets using electrowetting once seal 134 on control port 126 is removed.

In contrast, the third input port 184 has a different configuration relative to the input ports 110 and 112. In particular, the wall 186 of the third input port is spaced apart from a boundary of the channel port and thus does not coincide with the boundary of the associated channel port 190 of the top substrate assembly. This means that in the region of the channel port 190, the surface tension is not disrupted at the channel port and thus the surface tension remains high. Accordingly, when the oil is filled into the EWOD channel (typically via one of the first two fluid input ports), oil does not enter the third input well 188 as the surface tension holds the oil back. The third input 184 can be used, for example, to pipette using the force of the pipette a small amount of polar fluid directly into the EWOD channel of the device. The third input port generally is not used to hold extra fluid for drawing droplets into the EWOD channel at a later time, as this port is best used only for small fluid volumes.

Figure 20:
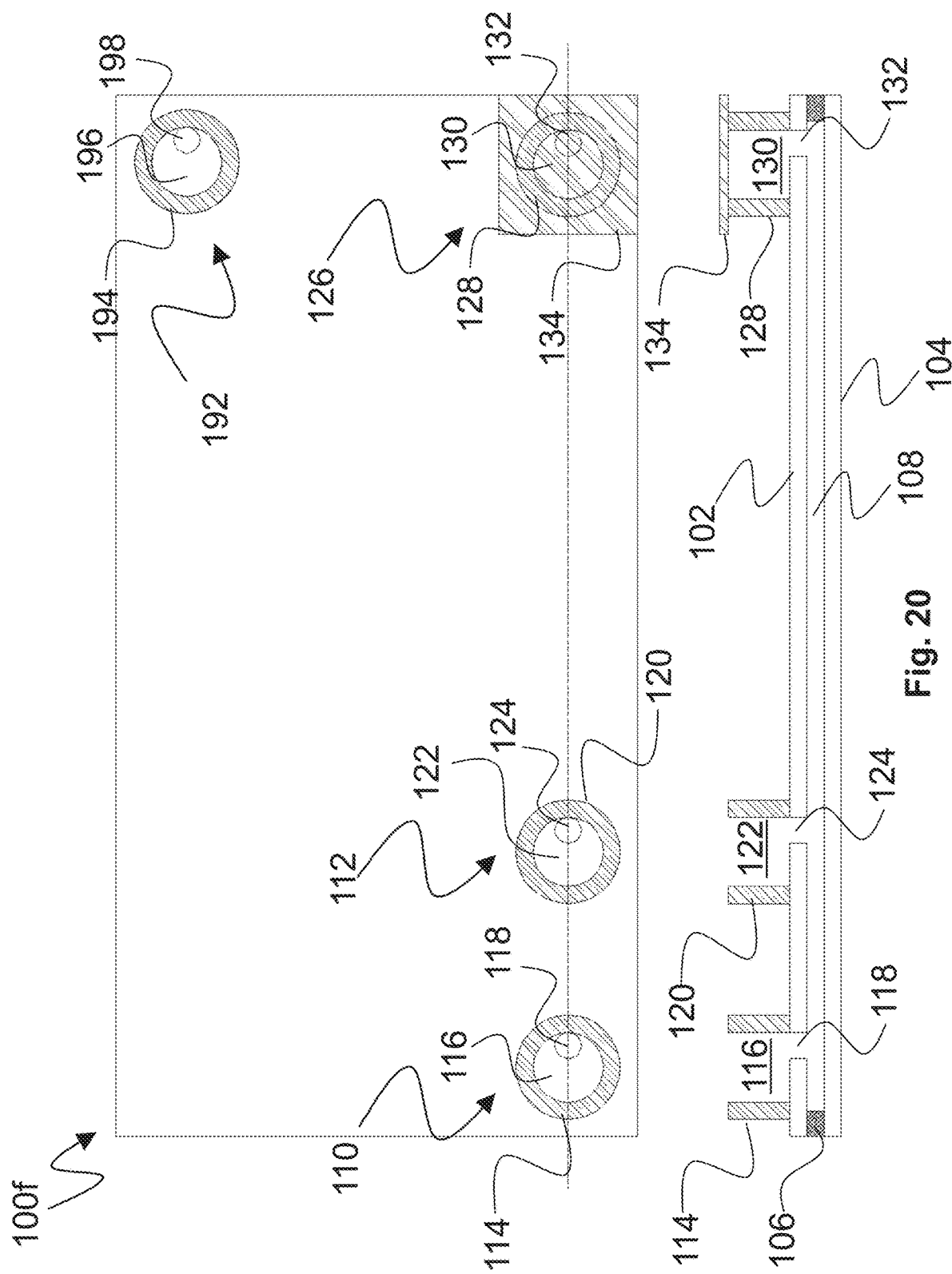
FIG. 20 is a drawing depicting a plan view and a side view of a seventh exemplary EWOD device in accordance with embodiments of the present invention.

FIG. 20 is a drawing depicting a plan view and a side view of an EWOD or AM-EWOD device 100f in accordance with another embodiment of the present invention. In this variation, the vent port may be configured instead as another fluid input port 192 in addition to the fluid input ports 110 and 112, and would be configured comparably. Accordingly, the fluid input vent port 192 includes a vent port wall 194 that is adhered to an outer surface of the top substrate assembly 102 by any suitable means. The vent port wall 194 defines a vent port well 196 in which an input fluid may be maintained. The vent port well 196 is in fluid communication with a vent port channel port 198 that is configured as a hole that extends through the top substrate assembly 102. In this embodiment, the vent port thus serves as both an air vent and another fluid input port. In addition, the fluid input vent port 192 is configured comparably as the other fluid input ports, with the vent port wall 194 coinciding with the boundary of the corresponding vent port channel port 198 to disrupt surface tension. Accordingly, as oil fills the device as in the first embodiment, the oil initially fills the EWOD channel and then excess oil distributes itself among the three fluid input ports. Polar fluid then can be added to all three fluid input ports, which moves into the EWOD channel upon removing or piercing the seal.

Figure 21:
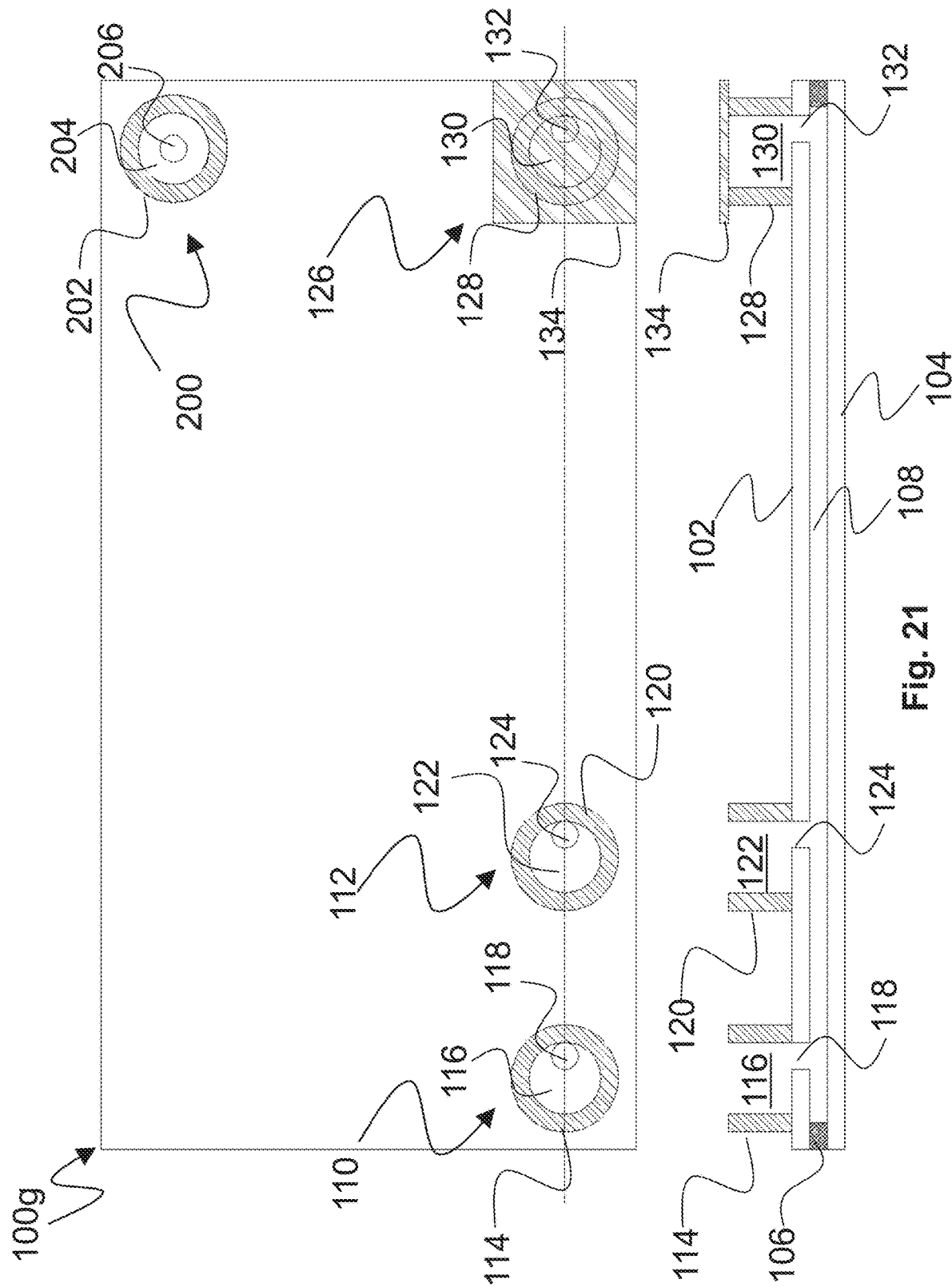
FIG. 21 is a drawing depicting a plan view and a side view of an eighth exemplary EWOD device in accordance with embodiments of the present invention.

FIG. 21 is a drawing depicting a plan view and a side view of an EWOD or AM-EWOD device 100g in accordance with another embodiment of the present invention. In this variation, the vent port again may be configured instead as another fluid input port 200 in addition to the fluid input ports 110 and 112. Accordingly, the fluid input vent port 200 includes a vent port wall 202 that is adhered to an outer surface of the top substrate assembly 102 by any suitable means. The vent port wall 202 defines a vent port well 204 through which an input fluid may be introduced. The vent port well 204 is in fluid communication with a vent port channel port 206 that is configured as a hole that extends through the top substrate assembly 102. In this embodiment, the vent port thus serves as both an air vent and another fluid input port.

In contrast, in this embodiment the fluid input vent port 200 is configured comparably as the third input port 184 in FIG. 19, whereby the vent port wall 202 does not coincide with the boundary of the associated vent port channel port 206 of the top substrate assembly. As above, this means that in the region of the vent port channel port 206, the surface tension is not disrupted at the vent port and remains high. Accordingly, when the oil is filled into the EWOD channel (typically via one of the first two fluid input ports), oil does not enter the vent port well 204 as the surface tension holds the oil back. This is another variation in which a third fluid input, in this case the vent port, can be used particularly to pipette a small amount of polar fluid directly into the EWOD channel of the device. In this embodiment as well, the fluid input vent port generally is not used to hold extra fluid for drawing droplets into the EWOD channel at a later time, as this port is best used only for small fluid volumes.

Figure 22:
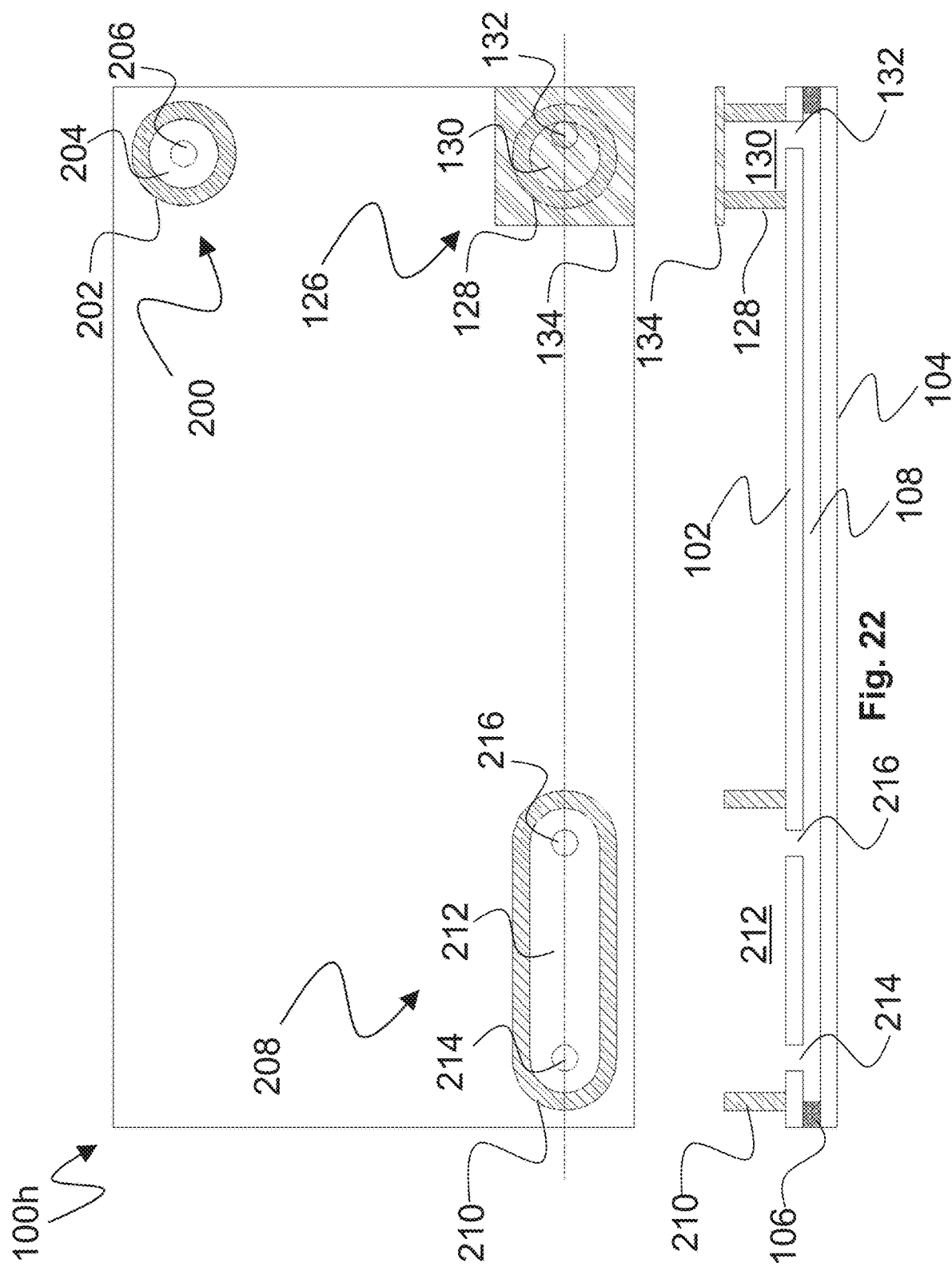
FIG. 22 is a drawing depicting a plan view and a side view of a ninth exemplary EWOD device in accordance with embodiments of the present invention.

FIG. 22 is a drawing depicting a plan view and a side view of an EWOD or AM-EWOD device 100h in accordance with another embodiment of the present invention. In this embodiment, the two fluid input ports essentially are linked together into a common fluid input structure. This configuration has an advantage that when oil is added to the device, the oil can enter the device via more than one channel port and therefore fills the EWOD channel more quickly. In addition, an excess of oil can exist in the combined well so that as polar fluid enters the device, oil redistributes itself maintaining a good head pressure. Accordingly, a fluid input structure 208 includes a wall 210 that is adhered to an outer surface of the top substrate assembly 102 by any suitable means. The wall 210 defines an elongated input well 212 through which an input fluid may be introduced. The fluid input structure 208 further includes a plurality of channel ports that fluidly connect the input well to the channel, such as for example a first channel port 214 and a second channel port 216 that are configured as holes that extend through the top substrate assembly 102.

Figure 23:
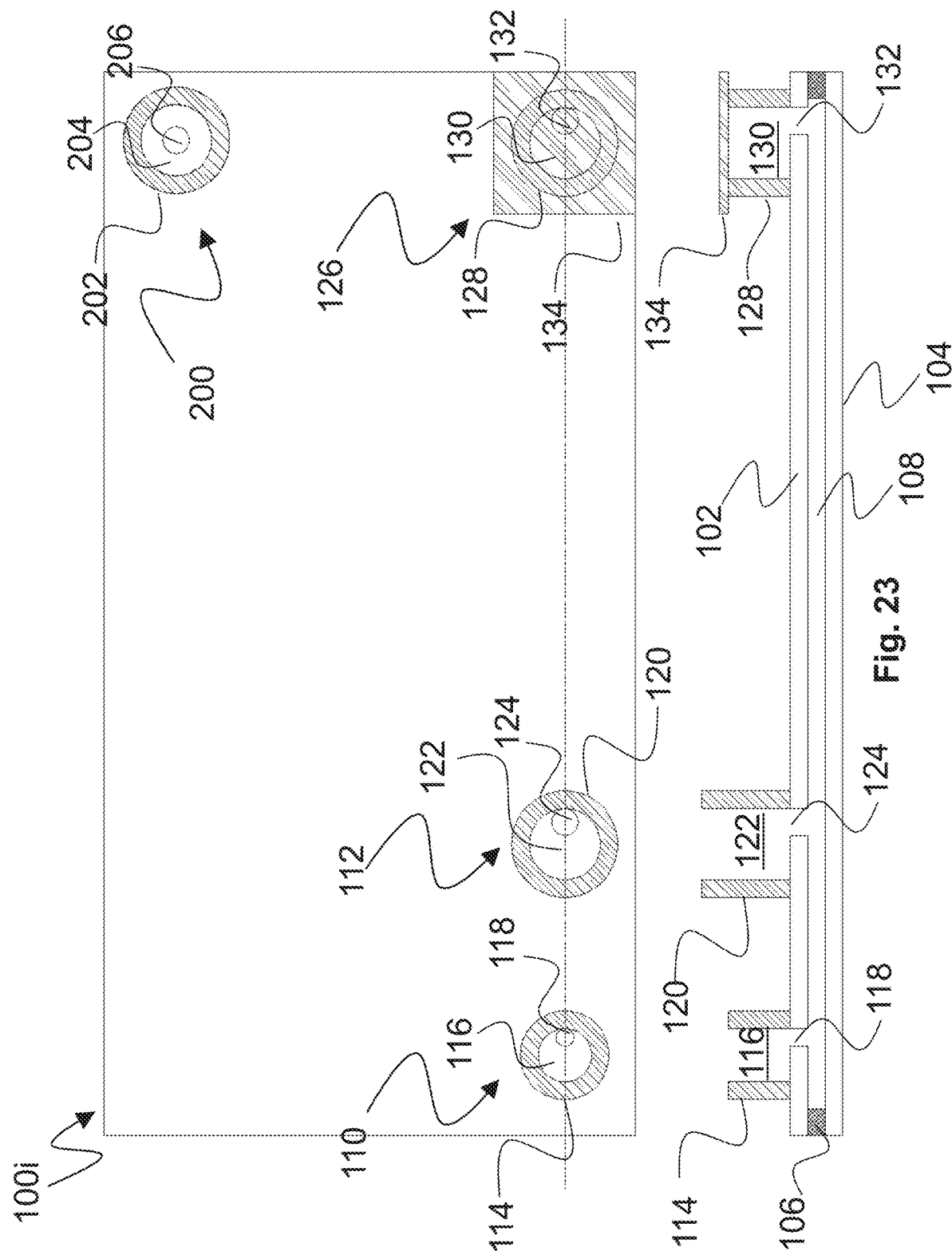
FIG. 23 is a drawing depicting a plan view and a side view of a tenth exemplary EWOD device in accordance with embodiments of the present invention.

FIG. 23 is a drawing depicting a plan view and a side view of an EWOD or AM-EWOD device 100i in accordance with another embodiment of the present invention. In the previous embodiments, configurations of the first and second fluid input ports 110 and 112 essentially have been identical. This, however, need not be the case. As illustrative, in the example of FIG. 23, the two input ports have different well heights, different well diameters, and different diameters of respective channel ports through the top substrate assembly (e.g., the second fluid input port 112 is higher, wider, and has a larger channel port as compared to the first fluid input port 110). As other potential example variations, the fluid input ports may have different wall tapers, be made of different materials, or have different coatings. The difference in configuration between the two input ports can help balance the loading of fluid between different fluid types and volumes. Some fluids, for example, may be more reluctant to enter the EWOD channel, and for such fluid a port with a taller well could be used to provide a greater head pressure for forcing such fluid into the EWOD channel. More generally, different polar fluids may be inputted via different fluid input port configurations so as to match the input structure with properties of a corresponding fluid to optimize the fluid input process.

FIG. 24 is a drawing depicting a plan view and a side view of an EWOD or AM-EWOD device 100j in accordance with another embodiment of the present invention. In this example, two fluid input ports 219 and 221 are incorporated into a plastic cover 220 which that is fixed onto the top substrate assembly 102. This configuration has an advantage of not needing to form the channel ports 222 and 224 by drilling or otherwise cutting holes through substrate material itself, which typically is made of glass, and therefore reduces the cost of the device. In the embodiment of FIG. 24, the control port 126 still is formed using a control port configured as a hole through the top substrate assembly. FIG. 25 is a drawing depicting a plan view and a side view of an EWOD or AM-EWOD device 100k in accordance with another embodiment of the present invention. In this example, a control port 226 and vent port 228 similarly are incorporated into a second plastic cover 230 that is fixed to the top substrate assembly 102. This configuration comparably obviates the need to form an exit port 232 and vent port 228 by drilling or otherwise cutting holes through the glass substrate material.

FIG. 26 is a drawing depicting a plan view and a side view of an EWOD or AM-EWOD device 100k in accordance with another embodiment of the present invention. In this example, instead of a second fluid input port 112 as in previous embodiments, a second port 232 operates first as a second control port, and then as a second fluid input port. Accordingly, the second port 232 includes a second wall 234 that is adhered to an outer surface of the top substrate assembly 102 by any suitable means. The second wall 234 defines a second well 236 that is in fluid communication with a second channel port 238 that is configured as a hole that extends through the top substrate assembly 102. The second channel port 238 at times may act as an exit port and at other times may act as an input channel port, as further detailed below. The second port 232 further includes a second seal 240 that is fixed to the second wall 234 to seal the second well 236 relative to the exterior of the EWOD device. The second seal 240 may be configured and operate comparably as the seal 134, and thus may be removed or pierced to break such seal to place the second port 232 in an unsealed state.

In exemplary embodiments, one of the control ports (e.g., the second port 232) first serves as a control port and then later as a fluid input port. The other control port (e.g., control port 126) first serves as a control port and then as a waste or exit port. In operation, the oil is added to the EWOD channel through the fluid input port 110. Excess oil fills this port. A polar fluid is then added to the fluid input port 110. The seal 240 from the second port 232 is then removed or pierced. The fluid and/or oil moves to try to balance the difference in the head of pressure between the two ports 110 and 232. The fluid from the first fluid input port 110 can therefore partially enter the EWOD channel at this point. Additional polar fluid then may be added to the second fluid input port 232 (which was initially a control port). When the user is ready to add the additional polar fluid, the seal 134 from the control port 126 is removed or pierced, and the fluid is drawn on from both input ports 110 and 232 using electrowetting comparably as in previous embodiments. An advantage of this embodiment is that it may make drawing challenging fluids into the device easier. For example, the difficult fluid, which is reluctant to enter the device, would be put in the first fluid input port 110. This fluid would then be subject to one seal being removed (which would act on this fluid only), and then the other seal being removed which would act on both fluids.

As another feature of this embodiment, port walls 114, 128, and 234 each may include a wall extension 242 that extends parallel to the first substrate assembly, which results in the wells having a smaller opening at the top. For the control port, the seal rests on the wall extension when the control port is in the sealed state. This wall extension 242 has a variety of advantages, including: (a) enabling the seals of the control ports to be secured more easily and with more support, (b) allowing the pipette to be guided into the correct position for pipetting fluid into the fluid input wells adjacent to the channel ports, and (c) minimizing oil evaporation from the wells particularly for applications in which the EWOD device may require heating.

As a further and exemplary embodiment, in all the previous embodiments, it will be appreciated that the top substrate could be formed as a single contiguous part, comprising one or more input ports and one or more control ports as has already been described. In this instance the one part top substrate could be comprised of plastic and manufactured, for example, by an injection molding process. An advantage of this embodiment is that a single part top substrate may simplifying the assembly of the device and/or reduce the manufacturing cost.

An aspect of the invention, therefore, is an electrowetting on dielectric (EWOD) device including an enhanced system for inputting fluid into the EWOD channel. In exemplary embodiments, the EWOD device includes a first substrate assembly and a second substrate assembly spaced apart to define a channel between the first and second substrate assemblies; an input port in fluid communication with the channel, the input port defining an input well for receiving a fluid for inputting into the channel; and a control port in fluid communication with the channel, the control port defining a control well for receiving a fluid and having a seal that seals the control port in a sealed state in which fluid is restricted from entering the control well from the channel. When the seal is removed or pierced, the control port is placed in an unsealed state thereby permitting fluid to enter the control well from the channel. The EWOD device may include one or more of the following features, either individually or in combination.

In an exemplary embodiment of the EWOD device, the input port includes an input wall that defines the input well and a channel port configured as a hole through the first substrate assembly to fluidly connect the input well to the channel, wherein an inner surface of the input wall coincides with a boundary of the channel port to disrupt surface tension of a fluid within the channel at the input port.

In an exemplary embodiment of the EWOD device, the input wall has a tapered inner surface that tapers toward the channel port.

In an exemplary embodiment of the EWOD device, the input wall has a wall extension that extends parallel to the first substrate assembly to provide a small opening into the input well.

In an exemplary embodiment of the EWOD device, the input port includes an input wall that defines the input well and a plurality of channel ports configured as holes through the first substrate assembly to fluidly connect the input well to the channel.

In an exemplary embodiment of the EWOD device, the EWOD device further includes a second input port in fluid communication with the channel, the second input port defining a second input well for receiving a fluid for inputting into the channel.

In an exemplary embodiment of the EWOD device, the second input port includes a second wall that defines the second input well and a second channel port configured as a hole through the first substrate assembly to fluidly connect the second input well to the channel, wherein an inner surface of the second wall coincides with a boundary of the second channel port to disrupt surface tension of a fluid within the channel at the second input port.

In an exemplary embodiment of the EWOD device, the second input port includes a second wall that defines the second input well and a second channel port configured as a hole through the first substrate assembly to fluidly connect the second input well to the channel, wherein an inner surface of the second wall is spaced apart from a boundary of the second channel port so as not to disrupt surface tension of a fluid within the channel at the second input port.

In an exemplary embodiment of the EWOD device, the second input port differs from the input port in at least one of well height, port diameter, channel port diameter, or wall material properties.

In an exemplary embodiment of the EWOD device, the control port includes a control wall that defines the control well and an exit port configured as a hole through the first substrate assembly to fluidly connect the control well to the channel, wherein an inner surface of the control wall coincides with a boundary of the exit port to disrupt surface tension of a fluid within the channel at the control port.

In an exemplary embodiment of the EWOD device, the control wall has a tapered inner surface that tapers toward the exit port.

In an exemplary embodiment of the EWOD device, the control wall has a wall extension that extends parallel to the first substrate assembly to provide a small opening into the control well, and the seal rests on the wall extension when the control port is in the sealed state.

In an exemplary embodiment of the EWOD device, the control port includes a control wall that defines the control well and a plurality of exit ports configured as holes through the first substrate assembly to fluidly connect the control well to the channel, wherein an inner surface of the control wall coincides with boundaries of the exit ports to disrupt surface tension of a fluid within the channel at the control port.

In an exemplary embodiment of the EWOD device, the control port includes at least one absorbent layer located within the control well for absorbing fluid that enters the control well.

In an exemplary embodiment of the EWOD device, the control port includes a plurality of absorbent layers located at different positions within the control well.

In an exemplary embodiment of the EWOD device, the EWOD device further includes a second control port in fluid communication with the channel, the second control port defining a second control well for receiving a fluid and having a second seal that seals the second control port in a sealed state in which fluid is restricted from entering the second control port. When the second seal is removed or pierced, the second control port is in an unsealed state thereby permitting fluid to enter the second control well from the channel.

In an exemplary embodiment of the EWOD device, the second control port includes a second control wall that defines the second control well and a second exit port configured as a hole through the first substrate assembly to fluidly connect the control well to the channel, wherein an inner surface of the second control wall coincides with a boundary of the second exit port to disrupt surface tension of a fluid within the channel at the second control port.

In an exemplary embodiment of the EWOD device, the EWOD device further includes a second control port in fluid communication with the channel, the second control port defining a second control well for receiving a fluid and having a second seal that seals the second control port in a sealed state in which fluid is restricted from entering the second control port. When the second seal is removed or pierced, the second control port is in an unsealed state thereby permitting the second control port to act as an input port for inputting fluid from the second control well into the channel.

In an exemplary embodiment of the EWOD device, the second control port includes a second control wall that defines the second control well and another channel port configured as a hole through the first substrate assembly to fluidly connect the second control well to the channel, wherein an inner surface of the second control wall coincides with a boundary of the another channel port to disrupt surface tension of a fluid within the channel at the second control port.

In an exemplary embodiment of the EWOD device, the EWOD device further includes a vent port in fluid communication with the EWOD channel, wherein the vent port vents air from the EWOD channel as fluid enters the EWOD channel from the input port.

In an exemplary embodiment of the EWOD device, the vent port is configured as another input port in fluid communication with the channel, the vent port defining a vent port input well for receiving a fluid for inputting into the channel.

In an exemplary embodiment of the EWOD device, the vent port includes a vent port wall that defines the vent port input well and a vent port channel port configured as a hole through the first substrate assembly to fluidly connect the vent port input well to the channel, wherein an inner surface of the vent port wall coincides with a boundary of the vent port channel port to disrupt surface tension of a fluid within the channel at the vent port.

In an exemplary embodiment of the EWOD device, the vent port includes a vent port wall that defines the vent port input well and a vent port channel port configured as a hole through the first substrate assembly to fluidly connect the vent port input well to the channel, wherein an inner surface of the vent port wall is spaced apart from a boundary of the vent port channel port so as not to disrupt surface tension of a fluid within the channel at the vent port.

In an exemplary embodiment of the EWOD device, the EWOD device further includes a first cover that is fixed on top of the first substrate assembly, and the input port is incorporated into the first cover.

In an exemplary embodiment of the EWOD device, the EWOD device further includes a second cover that is fixed on top of the first substrate assembly, and the control port is incorporated into the second cover.

In an exemplary embodiment of the EWOD device, the EWOD device further includes a vent port in fluid communication with the EWOD channel, wherein the vent port vents air from the EWOD channel as fluid enters the EWOD channel from the input port, and the vent port is incorporated into the second cover.

The described EWOD device according to any of the above embodiments may be employed to perform an enhanced method of controlling fluid flow through an electrowetting on dielectric (EWOD) device. In exemplary embodiments, the method of controlling fluid flow may include the steps of providing said EWOD device; inputting a non-polar fluid into the channel via the input port, wherein excess non-polar fluid after filling the EWOD channel accumulates within the input well and is restricted from entering the control well by the seal; inputting a polar fluid into the input well to form a fluid reservoir at a channel port that fluidly connects the input well to the channel; and removing or piercing the seal to place the control port in an unsealed state, wherein a portion of the non-polar fluid within the channel is displaced from the channel into the control well, and a portion of the polar fluid of the fluid reservoir enters the channel from the input well. The method of controlling fluid may include one or more of the following steps, either individually or in combination.

In an exemplary embodiment of the method of controlling fluid flow, the method further may include, after the seal is removed or pierced, applying an electrowetting force to dispense one or more liquid droplets from the fluid reservoir for manipulation within the channel.

In an exemplary embodiment of the method of controlling fluid flow, the method further may include: applying the electrowetting force to move the dispensed droplets to an exit port in fluid communication with the EWOD channel; forming an exit reservoir of the moved dispensed droplets adjacent to the exit port; and deactivating the electrowetting force in a region of the exit port, wherein the exit reservoir exits the channel via the exit port under a hydrostatic force.

In an exemplary embodiment of the method of controlling fluid flow, the exit port is a port that fluidly connects the channel to the control well of the control port.

In an exemplary embodiment of the method of controlling fluid flow, the method further may include performing a plurality of fluid flow cycles after the seal is removed or pierced, wherein each fluid flow cycle comprises the steps of: applying an electrowetting force to dispense one or more liquid droplets from the fluid reservoir for manipulation within the channel; applying the electrowetting force to move the dispensed droplets to the exit port; forming an exit reservoir of the moved dispensed droplets adjacent to the exit port; and deactivating the electrowetting force in the region of the exit port, wherein the exit reservoir exits the channel via the exit port under a hydrostatic force.

In an exemplary embodiment of the method of controlling fluid flow, the EWOD device includes: a first control port in fluid communication with the channel, the first control port defining a first control well for receiving a fluid and having a first seal that seals the first control port in a sealed state; and a second control port in fluid communication with the channel, the second control port defining a second control well for receiving a fluid and having a second seal that seals the second control port in a sealed state. The method of controlling fluid flow further comprising the steps of: removing or piercing the first seal to place the first control port in an unsealed state, wherein a portion of the non-polar fluid within the channel is displaced from the channel into the first control well and a first draw of the polar fluid reservoir enters the channel from the input well; and removing or piercing the second seal to place the second control port in an unsealed state, wherein an additional portion of the non-polar fluid within the channel is displaced from the channel into the second control well and a second draw of the polar fluid reservoir enters the channel from the input well.

In an exemplary embodiment of the method of controlling fluid flow, the EWOD device includes: a first input port in fluid communication with the channel, the first input port defining a first input well for receiving a fluid for inputting into the channel; and a second input port in fluid communication with the channel, the second input port defining a second input well for receiving a fluid for inputting into the channel. The method of controlling fluid flow further comprising the steps of: inputting polar fluid into the first input well to form a first fluid reservoir at a first channel port that fluidly connects the first input well to the channel; and inputting polar fluid into the second input well to form a second fluid reservoir at a second channel port that fluidly connects the second input well to the channel. When the seal is removed or pierced to place the control port in the unsealed state and a portion of the non-polar fluid reservoir within the channel displaces from the channel into the control well, a portion of the polar fluid from each of the first and second fluid reservoirs enters the channel respectively from the first and second input wells.

In an exemplary embodiment of the method of controlling fluid flow, the first fluid reservoir and the second fluid reservoir contain different polar fluids Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

The described embodiments could be used to provide an enhanced AM-EWOD device. The AM-EWOD device could form a part of a lab-on-a-chip system. Such devices could be used in manipulating, reacting and sensing chemical, biochemical or physiological materials. Applications include healthcare diagnostic testing, material testing, chemical or biochemical material synthesis, proteomics, tools for research in life sciences and forensic science.

REFERENCE SIGNS LIST

10—lower substrate
12—array element electrodes

12A—individual array element electrode
12B—individual array element electrode
14—liquid droplet
16—top substrate
18—spacer
20—non-polar fluid
22—insulator layer
24—first hydrophobic coating
26—contact angle
28—second hydrophobic coating
30—reference electrode
32—reader
34—cartridge
36—EWOD or AM-EWOD device
38—control electronics
40—storage device
42—cable of connecting wires
44—lower substrate
46—thin film electronics
48—array element electrodes
48A—individual array element electrode
48B individual array element electrode
50—electrode element array
51—array element
52—liquid droplets
54—top substrate
56—spacer
58—reference electrode
60—non-polar fluid
62—insulator layer
64—first hydrophobic coating
66—contact angle
68—second hydrophobic coating
70A—electrical load with droplet present
70B—electrical load with no droplet present
72—array element circuit
74—integrated row driver
76—column driver
78—array element circuit
80—column detection circuits
82—serial interface
84—voltage supply interface
86—number of connecting wires
88—actuation circuit
90—droplet sensing circuit
100a-l—EWOD or AM-EWOD device
102—first (top) substrate assembly
104—second (bottom) substrate assembly
106—spacer
108—EWOD channel
110—first fluid input port
112—second fluid input port
114—first wall
116—first input well
118—first channel port
120—second wall
122—second input well
124—second channel port
126—control port
128—control wall
130—control well
132—exit port
134—seal
136—vent port
138—non-polar fluid or oil
138A—displaced oil
140/140a—polar fluid reservoir
142/142a—polar fluid reservoir
144—dispensed droplets
146—exit reservoir
148—additional droplets
150—second control port
152—second control wall
154—second control well
156—second exit port
158—second seal
160—control port structure
162—enlarged control wall
164—enlarged control well
168—second exit port
170—seal
172—absorbent layer
174—first absorbent layer
176—second absorbent layer
178—tapered inner surface
180—tapered inner surface
182—tapered inner surface
184—third fluid input port
186—third wall
188—third input well
190—third channel port
192—fluid input vent port
194—vent port wall
196—vent port well
198—vent port channel port
200—fluid input vent port
202—vent port wall
204—vent port well
206—vent port channel port
208—fluid input structure
210—elongated wall
212—elongated input well
214—first channel port
216—second channel port
218—fluid input port
219—fluid input port
220—plastic cover
222—channel port
224—channel port
226—control port
228—vent port
230—second plastic cover
232—exit port
234—second wall
236—second well
238—second channel port
240—second seal
242—wall extension

What is claimed is:

1. An electrowetting on dielectric (EWOD) device comprising:
a first substrate assembly and a second substrate assembly spaced apart to define a channel between the first and second substrate assemblies;
an input port in fluid communication with the channel, the input port defining an input well for receiving a fluid for inputting into the channel;
a control port that is in fluid communication with the channel, the control port defining a control well for receiving a fluid and having a seal that seals the control port in a sealed state in which fluid is restricted from entering the control well from the channel;

wherein when the seal is removed or pierced, the control port is placed in an unsealed state thereby permitting fluid to enter the control well from the channel; and a vent port in fluid communication with the EWOD channel, wherein the vent port is configured to vent air from the EWOD channel as fluid enters the EWOD channel from the input port and to prevent air from being trapped in the EWOD channel prior to removing or piercing the seal.

2. The EWOD device of claim 1, wherein the input port includes an input wall that defines the input well and a channel port configured as a hole through the first substrate assembly to fluidly connect the input well to the channel, wherein an inner surface of the input wall coincides with a boundary of the channel port to disrupt surface tension of a fluid within the channel at the input port.

3. The EWOD device of claim 2, wherein the input wall has a tapered inner surface that tapers toward the channel port.

4. The EWOD device of claim 2, wherein the input wall has a wall extension that extends parallel to the first substrate assembly to provide a small opening into the input well.

5. The EWOD device of claim 1, wherein the input port includes an input wall that defines the input well and a plurality of channel ports configured as holes through the first substrate assembly to fluidly connect the input well to the channel.

6. The EWOD device of claim 1, further comprising a second input port in fluid communication with the channel, the second input port defining a second input well for receiving a fluid for inputting into the channel.

7. The EWOD device of claim 6, wherein the second input port includes a second wall that defines the second input well and a second channel port configured as a hole through the first substrate assembly to fluidly connect the second input well to the channel, wherein an inner surface of the second wall coincides with a boundary of the second channel port to disrupt surface tension of a fluid within the channel at the second input port.

8. The EWOD device of claim 6, wherein the second input port includes a second wall that defines the second input well and a second channel port configured as a hole through the first substrate assembly to fluidly connect the second input well to the channel, wherein an inner surface of the second wall is spaced apart from a boundary of the second channel port so as not to disrupt surface tension of a fluid within the channel at the second input port.

9. The EWOD device of claim 6, wherein the second input port differs from the input port in at least one of well height, port diameter, channel port diameter, or wall material properties.

10. The EWOD device of claim 1, wherein the control port includes a control wall that defines the control well and an exit port configured as a hole through the first substrate assembly to fluidly connect the control well to the channel, wherein an inner surface of the control wall coincides with a boundary of the exit port to disrupt surface tension of a fluid within the channel at the control port.

11. The EWOD device of claim 10, wherein the control wall has a tapered inner surface that tapers toward the exit port.

12. The EWOD device of claim 10, wherein the control wall has a wall extension that extends parallel to the first substrate assembly to provide a small opening into the control well, and the seal rests on the wall extension when the control port is in the sealed state.

13. The EWOD device of claim 1, wherein the control port includes a control wall that defines the control well and a plurality of exit ports configured as holes through the first substrate assembly to fluidly connect the control well to the channel, wherein an inner surface of the control wall coincides with boundaries of the exit ports to disrupt surface tension of a fluid within the channel at the control port.

14. The EWOD device of claim 1, wherein the control port includes at least one absorbent layer located within the control well for absorbing fluid that enters the control well.

15. The EWOD device of claim 14, wherein the control port includes a plurality of absorbent layers located at different positions within the control well.

16. The EWOD device of claim 1, further comprising a second control port in fluid communication with the channel, the second control port defining a second control well for receiving a fluid and having a second seal that seals the second control port in a sealed state in which fluid is restricted from entering the second control port;

wherein when the second seal is removed or pierced, the second control port is in an unsealed state thereby permitting fluid to enter the second control well from the channel.

17. The EWOD device of claim 16, wherein the second control port includes a second control wall that defines the second control well and a second exit port configured as a hole through the first substrate assembly to fluidly connect the control well to the channel, wherein an inner surface of the second control wall coincides with a boundary of the second exit port to disrupt surface tension of a fluid within the channel at the second control port.

18. The EWOD device of claim 1, further comprising a second control port in fluid communication with the channel, the second control port defining a second control well for receiving a fluid and having a second seal that seals the second control port in a sealed state in which fluid is restricted from entering the second control port;

wherein when the second seal is removed or pierced, the second control port is in an unsealed state thereby permitting the second control port to act as an input port for inputting fluid from the second control well into the channel.

19. The EWOD device of claim 18, wherein the second control port includes a second control wall that defines the second control well and another channel port configured as a hole through the first substrate assembly to fluidly connect the second control well to the channel, wherein an inner surface of the second control wall coincides with a boundary of the another channel port to disrupt surface tension of a fluid within the channel at the second control port.

20. The EWOD device of claim 1, wherein the vent port is configured as another input port in fluid communication with the channel, the vent port defining a vent port input well for receiving a fluid for inputting into the channel.

21. The EWOD device of claim 20, wherein the vent port includes a vent port wall that defines the vent port input well and a vent port channel port configured as a hole through the first substrate assembly to fluidly connect the vent port input well to the channel, wherein an inner surface of the vent port wall coincides with a boundary of the vent port channel port to disrupt surface tension of a fluid within the channel at the vent port.

22. The EWOD device of claim 20, wherein the vent port includes a vent port wall that defines the vent port input well and a vent port channel port configured as a hole through the first substrate assembly to fluidly connect the vent port input well to the channel, wherein an inner surface of the vent port wall is spaced apart from a boundary of the vent port channel port so as not to disrupt surface tension of a fluid within the channel at the vent port.

23. The EWOD device of claim 1, further comprising a first cover that is fixed on top of the first substrate assembly, and the input port is incorporated into the first cover.

24. The EWOD device of claim 23, further comprising a second cover that is fixed on top of the first substrate assembly, and the control port is incorporated into the second cover.

25. The EWOD device of claim 24, further comprising a vent port in fluid communication with the EWOD channel, wherein the vent port vents air from the EWOD channel as fluid enters the EWOD channel from the input port, and the vent port is incorporated into the second cover.

26. A method of controlling fluid flow through an electrowetting on dielectric (EWOD) device comprising the steps of
    providing an EWOD device comprising a first substrate assembly and a second substrate assembly spaced apart to define a channel between the first and second substrate assemblies; an input port in fluid communication with the channel, the input port defining an input well for receiving a fluid for inputting into the channel; and a control port in fluid communication with the channel, the control port defining a control well for receiving a fluid and having a seal that seals the control port in a sealed state;
    inputting a non-polar fluid into the channel via the input port, wherein excess non-polar fluid after filling the EWOD channel accumulates within the input well and is restricted from entering the control well by the seal, and wherein air within the channel is vented through a vent port in fluid communication with the channel as the non-polar fluid enters the channel from the input port to prevent air from being trapped in the channel;
    inputting a polar fluid into the input well to form a fluid reservoir at a channel port that fluidly connects the input well to the channel; and
    removing or piercing the seal to place the control port in an unsealed state, wherein a portion of the non-polar fluid within the channel is displaced from the channel into the control well, and a portion of the polar fluid of the fluid reservoir enters the channel from the input well.

27. The method of controlling fluid flow of claim 26, further comprising, after the seal is removed or pierced, applying an electrowetting force to dispense one or more liquid droplets from the fluid reservoir for manipulation within the channel.

28. The method of controlling fluid flow of claim 27, further comprising:
    applying the electrowetting force to move the dispensed droplets to an exit port in fluid communication with the EWOD channel;
    combining the moved dispensed droplets to form an exit reservoir of the moved dispensed droplets adjacent to the exit port; and
    deactivating the electrowetting force in a region of the exit port, wherein the exit reservoir exits the channel via the exit port under a hydrostatic force.

29. The method of controlling fluid flow of claim 28, wherein the exit port is a port that fluidly connects the channel to the control well of the control port.

30. The method of controlling fluid flow of claim 26, further comprising performing a plurality of fluid flow cycles after the seal is removed or pierced, wherein each fluid flow cycle comprises the steps of:
    applying an electrowetting force to dispense one or more liquid droplets from the fluid reservoir for manipulation within the channel;
    applying the electrowetting force to move the dispensed droplets to the exit port;
    combining the moved dispensed droplets to form an exit reservoir of the moved dispensed droplets adjacent to the exit port; and
    deactivating the electrowetting force in the region of the exit port, wherein the exit reservoir exits the channel via the exit port under a hydrostatic force.

31. The method of controlling fluid flow of claim 26, wherein the EWOD device includes:
    a first control port in fluid communication with the channel, the first control port defining a first control well for receiving a fluid and having a first seal that seals the first control port in a sealed state; and
    a second control port in fluid communication with the channel, the second control port defining a second control well for receiving a fluid and having a second seal that seals the second control port in a sealed state;
    the method of controlling fluid flow further comprising the steps of:
    removing or piercing the first seal to place the first control port in an unsealed state, wherein a portion of the non-polar fluid within the channel is displaced from the channel into the first control well and a first draw of the polar fluid reservoir enters the channel from the input well; and
    removing or piercing the second seal to place the second control port in an unsealed state, wherein an additional portion of the non-polar fluid within the channel is displaced from the channel into the second control well and a second draw of the polar fluid reservoir enters the channel from the input well.

32. The method of controlling fluid flow of claim 26, wherein the EWOD device includes:
    a first input port in fluid communication with the channel, the first input port defining a first input well for receiving a fluid for inputting into the channel; and
    a second input port in fluid communication with the channel, the second input port defining a second input well for receiving a fluid for inputting into the channel;
    the method of controlling fluid flow further comprising the steps of:
    inputting polar fluid into the first input well to form a first fluid reservoir at a first channel port that fluidly connects the first input well to the channel; and
    inputting polar fluid into the second input well to form a second fluid reservoir at a second channel port that fluidly connects the second input well to the channel;
    wherein when the seal is removed or pierced to place the control port in the unsealed state and a portion of the non-polar fluid reservoir within the channel displaces from the channel into the control well, a portion of the polar fluid from each of the first and second fluid reservoirs enters the channel respectively from the first and second input wells.

33. The method of controlling fluid flow of 32, wherein the first fluid reservoir and the second fluid reservoir contain different polar fluids.

34. A method of controlling fluid flow through an electrowetting on dielectric (EWOD) device comprising the steps of:

providing an EWOD device comprising a first substrate assembly and a second substrate assembly spaced apart to define a channel between the first and second substrate assemblies; an input port in fluid communication with the channel, the input port defining an input well for receiving a fluid for inputting into the channel; and a control port in fluid communication with the channel, the control port defining a control well for receiving a fluid and having a seal that seals the control port in a sealed state;

inputting a non-polar fluid into the channel via the input port, wherein excess non-polar fluid after filling the EWOD channel accumulates within the input well and is restricted from entering the control well by the seal, and wherein air within the channel is vented through a vent port in fluid communication with the EWOD channel as the non-polar fluid enters the channel from the input port to prevent air from being trapped in the channel;

inputting a polar fluid into the input well to form a fluid reservoir at a channel port that fluidly connects the input well to the channel;

removing or piercing the seal to place the control port in an unsealed state, wherein a portion of the non-polar fluid within the channel is displaced from the channel into the control well; and applying an electrowetting force to cause a portion of the polar fluid of the fluid reservoir to enter the channel from the input well.

* * * * *